United States Patent
Yang et al.

(10) Patent No.: US 9,191,935 B2
(45) Date of Patent: *Nov. 17, 2015

(54) METHOD FOR TRANSMITTING CONTROL INFORMATION AND APPARATUS THEREFOR

(71) Applicant: LG ELECTRONICS INC., Seoul (KR)

(72) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/530,310

(22) Filed: Oct. 31, 2014

(65) Prior Publication Data

US 2015/0055606 A1 Feb. 26, 2015

Related U.S. Application Data

(63) Continuation of application No. 13/969,107, filed on Aug. 16, 2013, now Pat. No. 8,891,479, which is a continuation of application No. 13/383,311, filed as application No. PCT/KR2011/004432 on Jun. 16, 2011, now Pat. No. 8,526,387.

(60) Provisional application No. 61/355,544, filed on Jun. 16, 2010, provisional application No. 61/365,747, filed on Jul. 19, 2010, provisional application No. 61/379,737, filed on Sep. 3, 2010.

(51) Int. Cl.
*H04W 72/04* (2009.01)
*H04L 1/18* (2006.01)
(Continued)

(52) U.S. Cl.
CPC ......... *H04W 72/0413* (2013.01); *H04L 1/1671* (2013.01); *H04L 1/1861* (2013.01); *H04L 5/001* (2013.01); *H04L 5/0055* (2013.01); *H04L 5/0094* (2013.01); *H04L 1/1812* (2013.01); *H04L 5/0023* (2013.01); *H04L 5/0032* (2013.01); *H04L 5/0057* (2013.01)

(58) Field of Classification Search
USPC .......................................................... 370/252
See application file for complete search history.

(56) References Cited

U.S. PATENT DOCUMENTS

2009/0129317 A1* 5/2009 Che et al. ................. 370/328
2009/0175205 A1* 7/2009 Mathew et al. ........... 370/281
(Continued)

FOREIGN PATENT DOCUMENTS

JP 2013530602 A 7/2013
WO 2011/140002 A1 11/2011

OTHER PUBLICATIONS

LG Electronics, "3rd Generation Partnership Project; Technical Specification Group Radio Access Network; Evolved Universal Terrestrial Radio Access (E-UTRA) Physical layer procedures (Release 10)", 3GPP TS 36.213 v10.1.0,(Mar. 2011), pp. 1-115.
(Continued)

*Primary Examiner* — Jenee Williams
(74) *Attorney, Agent, or Firm* — Birch, Stewart, Kolasch & Birch, LLP

(57) ABSTRACT

A method for transmitting uplink control information. The method according to an embodiment includes identifying a Hybrid Automatic Repeat reQuest—Acknowledgement (HARQ-ACK)(0) and a HARQ-ACK(1), and transmitting b(0)b(1) using a PUCCH resource among a plurality of PUCCH resources based on the HARQ-ACK(0) and the HARQ-ACK(1). a Physical Downlink Control Channel (PDCCH) on the primary cell.

12 Claims, 25 Drawing Sheets

(51) Int. Cl.
*H04L 5/00* (2006.01)
*H04L 1/16* (2006.01)

(56) References Cited

U.S. PATENT DOCUMENTS

| | | | | |
|---|---|---|---|---|
| 2010/0172428 | A1* | 7/2010 | Pani et al. | 375/262 |
| 2010/0195629 | A1* | 8/2010 | Chen et al. | 370/336 |
| 2010/0272048 | A1* | 10/2010 | Pan et al. | 370/329 |
| 2010/0318869 | A1* | 12/2010 | Kashima | 714/748 |
| 2011/0242997 | A1* | 10/2011 | Yin | 370/252 |
| 2012/0014320 | A1* | 1/2012 | Nam et al. | 370/328 |
| 2012/0076042 | A1* | 3/2012 | Chun et al. | 370/252 |
| 2012/0269103 | A1* | 10/2012 | Papasakellariou et al. | 370/280 |

OTHER PUBLICATIONS

LG Electronics, "3rd Generation Partnership Project; Technical Specification Group Radio Access Network; Evolved Universal Terrestrial Radio Access (E-UTRA) Physical layer procedures (Release 9)", 3GPP TS 36.213 v9.1.0,(Mar. 2010), pp. 1-79.

LG Electronics, "ACK/NACK resource allocation in LET-A", Discussion and decision, 3GPP TSG RAN WG1 #61, Montreal, Canada, May 10, 2010-May 14, 2010, R1-103397, pp. 1-5.

LG Electronics, "Design of Mapping Tables for PUCCH Format 1b with Channel Selection", Discussion and decision, 3GPP TSG RAN WG1 Meeting #62bis, Xi'an, China, Oct. 11, 2010-Oct. 15, 2011, R1-105154, pp. 2-13.

LG Electronics, "Finalization on Mapping Table for FDD/TDD", Decision, 3GPP TSG RAN WG1 63, Jacksonville, USA, Nov. 15, 2010-Nov. 19, 2010, R1-106509, pp. 2-5.

LG Electronics, "PUCCH A/N channel design in LTE-A", Discussion and decision, 3GPP TSG RAN WG1 #61, Montreal, Canada, May 10, 2010-May 14, 2010, R1-102781, pp. 1-6.

LG Electronics, "Resource allocation for FDD channel selection", Discussion and decision, 3GPP TSG RAN WG1 #64, Taipei, Taiwan, Feb. 21, 2011-Feb. 25, 2011, R1-110877, pp. 2-6.

LG Electronics, "Support of ULACK/NACK channel selectin for carrier aggregation", Discussion and decision, 3GPP TSG RAN WG1 #61, Montreal, Canada, May 10, 2010-May 14, 2010, R1-102856, pp. 1-6.

Ad Hoc Rapporteur, "Candidate Proposals on Mapping Table for PUCCH Format 1b with Channel Selection", TSG-RAN WG1 Meeting #62, R1-105113, Madrid, Spain, Aug. 23-Aug. 27, 2010, 2 pages.

Catt, "Design of Mapping Tables for PUCCH Format 1b with Channel Selection", 3GPP TSG RAN WG1 Meeting #62bis, R1-105154, Xi'an, China, Oct. 11-15, 2010, 11 pages.

LG Electronics, "Resource allocation for FDD channel selection", 3GPP TSG RAN WG1 #64, R1-110877, Taipei, Taiwan, Feb. 21-25, 2011, 5 pages.

NTT Docomo, "Mapping Table for Rel. 10 Channel Selection for CA", 3GPP TSG RAN WG1 Meeting #62, R1-104926, Madrid, Spain, Aug. 23-27, 2010, pp. 1-5.

Panasonic et al., "Finalization on Mapping Table for FDD/TDD", 3GPP TSG RAN WG1 63, R1-106509, Jacksonville, USA, Nov. 15-19, 2010, 6 pages.

Panasonic, "Support of UL ACK/NACK channel selection for carrier aggregation", 3GPP TSG RAN WG1 Meeting #59bis, R1-100364, Valencia, Spain, Jan. 18-22, 2010, pp. 1-6.

LG Electronics, "ACK/NACK resource allocation in LTE-A", Discussion and decision, 3GP TSG RAN WG1 #81, Montreal, Canada, May 10-14, 2010, R1-103397, pp. 1-5.

LG Electronics, "Uplink ACK/NACK resource allocation in TDD", Discussion and decision, 3GPP TSG RAN WG1 $52bis, Shenzhen, China, Mar. 31-Apr. 4, 2008, R1-081257, pp. 1-5.

Motorola, Uplink ACK/NACK for Carrier Aggregation, Discussion, 3GPP TSG RAN#60, San Francisco, USA, Feb. 22-26, 2010, R1-101468, pp. 1-3.

* cited by examiner

FIG. 20
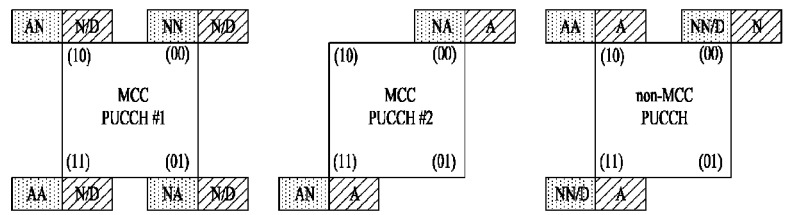
(a) Alt a
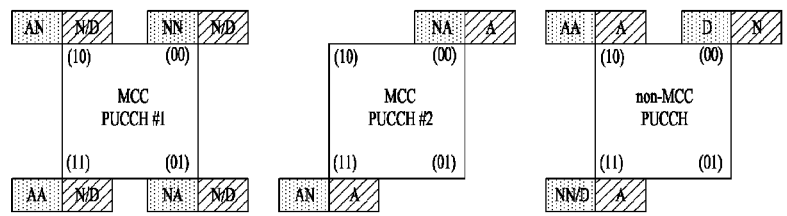
(b) Alt b
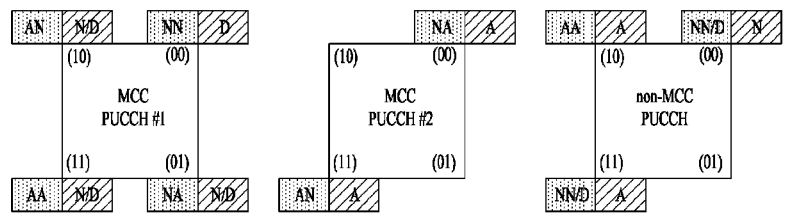
(c) Alt c

FIG. 23
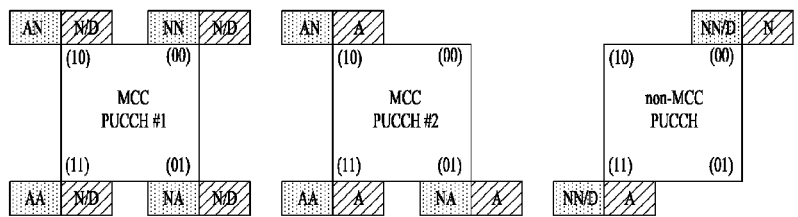
(a) Alt a
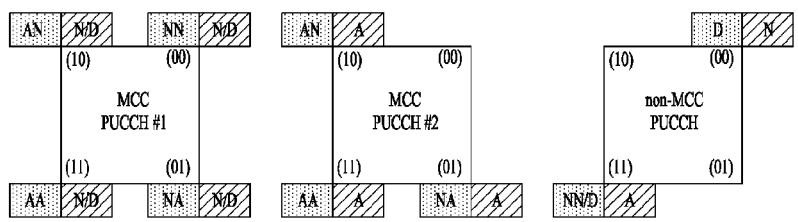
(b) Alt b
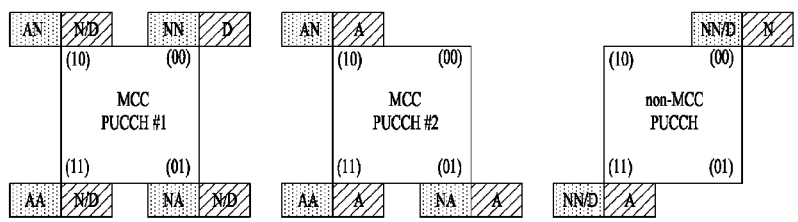
(c) Alt c

METHOD FOR TRANSMITTING CONTROL INFORMATION AND APPARATUS THEREFOR

CROSS-REFERENCE TO RELATED APPLICATIONS

This application is a Continuation of co-pending application Ser. No. 13/969,107 filed Aug. 16, 2013, which is a Continuation of application Ser. No. 13/383,311 (now U.S. Pat. No. 8,526,387, issued on Sep. 3, 2013) filed on Jan. 10, 2012, which is a National Phase of PCT/KR2011/004432 filed on Jun. 16, 2011, which claims priority under 35 U.S.C. 119(e) to U.S. Provisional Application Nos. 61/355,544, 61/365,747, and 61/379,737 filed on Jun. 16, 2010, Jul. 19, 2010, and Sep. 3, 2010 respectively, all of which are hereby expressly incorporated by reference into the present application.

BACKGROUND

1. Field of the Invention

The present invention relates to a wireless communication system and, more particularly, to a method for transmitting control information and an apparatus therefore.

2. Discussion of the Related Art

Wireless communication systems are widely developed to provide various communication services such as voice or data services. In general, wireless communication systems are multiple access systems capable of sharing available system resources (bandwidths, transmission power, etc.) to support communication with multiple users. Examples of multiple access systems include Code Division Multiple Access (CDMA), Frequency Division Multiple Access (FDMA), Time Division Multiple Access (TDMA), OFDMA (Orthogonal Frequency Division Multiple Access), SC-FDMA (Single Carrier Frequency Division Multiple Access), etc.

SUMMARY OF THE INVENTION

An object of the present invention devised to solve the problem lies in a method for efficiently transmitting uplink control information and an apparatus therefore.

Another object of the present invention devised to solve the problem lies in a method for efficiently transmitting control information, preferably, ACK/NACK information in a multi-carrier environment and an apparatus therefore.

It will be appreciated by persons skilled in the art that the objects that can be achieved with the present invention are not limited to what has been particularly described hereinabove and the above and other objects that the present invention can achieve will be more clearly understood from the following detailed description.

The objects of the present invention can be achieved by providing a method for transmitting uplink control information in a situation in which a plurality of cells including a primary cell and a secondary cell is configured in a wireless communication system, the method comprising: selecting one PUCCH resource corresponding to a plurality of HARQ-ACKs (Hybrid Automatic Repeat reQuest—Acknowledgements) from a plurality of PUCCH resources for PUCCH (Physical Uplink Control Channel) format 1; and transmitting bit values corresponding to the plurality of HARQ-ACKs using the selected PUCCH resource, wherein the relationship among the plurality of HARQ-ACKs, PUCCH resource and bit values includes the relationship of Table 1

TABLE 1

| HARQ-ACK(0) | HARQ-ACK(1) | $n^{(1)}_{PUCCH,i}$ | b(0)b(1) |
|---|---|---|---|
| ACK | NACK/DTX | $n^{(1)}_{PUCCH,0}$ | 11 |
| NACK | NACK/DTX | $n^{(1)}_{PUCCH,0}$ | 00 | where HARQ-ACK(0) indicates ACK/NACK/DTX response to a data block related to the primary cell, HARQ-ACK(1) indicates ACK/NACK/DTX response to a data block related to the secondary cell, $n^{(1)}_{PUCCH,i}$ (i=0, 1) indicates a plurality of PUCCH resources for the PUCCH format 1, $n^{(1)}_{PUCCH,0}$ indicates a PUCCH resource linked to a PDCCH (Physical Downlink Control Channel) on the primary cell, and b(0)b(1) indicates the bit values.

The objects of the present invention can be achieved by providing a communication apparatus configured to transmit uplink control information in a situation in which a plurality of cells including a primary cell and a secondary cell is configured in a wireless communication system, the communication apparatus comprising a radio frequency (RF) unit and a processor, wherein the processor is configured to select one PUCCH resource corresponding to a plurality of HARQ-ACKs (Hybrid Automatic Repeat reQuest—Acknowledgements) from a plurality of PUCCH resources for PUCCH (Physical Uplink Control Channel) format 1 and transmit bit values corresponding to the plurality of HARQ-ACKs using the selected PUCCH resource, wherein the relationship among the plurality of HARQ-ACKs, PUCCH resource and bit values includes the relationship of the following Table 1

TABLE 1

| HARQ-ACK(0) | HARQ-ACK(1) | $n^{(1)}_{PUCCH,i}$ | b(0)b(1) |
|---|---|---|---|
| ACK | NACK/DTX | $n^{(1)}_{PUCCH,0}$ | 11 |
| NACK | NACK/DTX | $n^{(1)}_{PUCCH,0}$ | 00 | where HARQ-ACK(0) indicates ACK/NACK/DTX response to a data block related to the primary cell, HARQ-ACK(1) indicates ACK/NACK/DTX response to a data block related to the secondary cell, $n^{(1)}_{PUCCH,i}$ (i=0, 1) indicates a plurality of PUCCH resources for the PUCCH format 1, $n^{(1)}_{PUCCH,0}$ indicates a PUCCH resource linked to a PDCCH (Physical Downlink Control Channel) on the primary cell, and b(0)b(1) indicates the bit values.

The relationship among the plurality of HARQ-ACKs, PUCCH resource and bit values may further include the relationship of the following Table 2

TABLE 2

| HARQ-ACK(0) | HARQ-ACK(1) | HARQ-ACK(2) | HARQ-ACK(3) | $n^{(1)}_{PUCCH,i}$ | b(0)b(1) |
|---|---|---|---|---|---|
| ACK | ACK | NACK/DTX | NACK/DTX | $n^{(1)}_{PUCCH,0}$ | 11 |
| ACK | NACK | NACK/DTX | NACK/DTX | $n^{(1)}_{PUCCH,0}$ | 10 |
| NACK | ACK | NACK/DTX | NACK/DTX | $n^{(1)}_{PUCCH,0}$ | 01 |
| NACK | NACK | NACK/DTX | NACK/DTX | $n^{(1)}_{PUCCH,0}$ | 00 | where HARQ-ACK(0)(1) indicates ACK/NACK/DTX responses to data blocks related to the primary cell, HARQ-ACK(2)(3) indicates ACK/NACK/DTX responses to data blocks related to the secondary cell, $n^{(1)}_{PUCCH,i}$ (i=0, 1, 2, 3) indicates a plurality of PUCCH resources for the PUCCH format 1, $n^{(1)}_{PUCCH,0}$ indicates a PUCCH resource linked to a PDCCH (Physical Downlink Control Channel) on the primary cell, and b(0)b(1) indicates the bit values.

$n^{(1)}{}_{PUCCH, 0}$ may include PUCCH resources for PUCCH format 1, desirably, PUCCH format 1b.

The relationship of Table 1 may further include a case in which transmission of the plurality of HARQ-ACKs is dropped if HARQ-ACK(0) is DTX and HARQ-ACK(1) is NACK.

The relationship of Table 2 may further include a case in which transmission of the plurality of HARQ-ACKs is dropped if HARQ-ACK(0) and HARQ-ACK(1) are DTX and HARQ-ACK(2) and HARQ-ACK(3) are NACK.

The primary cell may include a primary component carrier (PCC) and the secondary cell may include a secondary component carrier (SCC).

The uplink control channel may include a PUCCH (Physical Uplink Control Channel) and the downlink control channel may include a PDCCH (Physical Downlink Control Channel).

The objects of the present invention can be achieved by providing a method for transmitting uplink control information in a situation in which a plurality of cells including a primary cell and a secondary cell is configured in a wireless communication system, the method comprising: selecting one uplink control channel resource corresponding to a plurality of HARQ-ACKs from a plurality of uplink control channel resources; and transmitting modulation symbols corresponding to the plurality of HARQ-ACKs using the selected uplink control channel resource, wherein a mapping relationship between the plurality of HARQ-ACKs and the modulation symbols is equal to a mapping result of HARQ-ACKs and modulation symbols for one or more data blocks received on a single downlink carrier on the basis of one or more first HARQ-ACKs for one or more data blocks related to the primary cell, if one or more second HARQ-ACKs for one or more data blocks related to the secondary cell, except the one or more first HARQ-ACKs, are all NACK or DTX (Discontinuous Transmission).

The objects of the present invention can be achieved by providing a communication apparatus configured to transmit uplink control information in a situation in which a plurality of cells including a primary cell and a secondary cell is configured in a wireless communication system, the communication apparatus comprising an RF (Radio Frequency) unit and a processor, wherein the processor is configured to select one uplink control channel resource corresponding to a plurality of HARQ-ACKs from a plurality of uplink control channel resources, and transmit modulation symbols corresponding to the plurality of HARQ-ACKs using the selected uplink control channel resource, wherein a mapping relationship between the plurality of HARQ-ACKs and the modulation symbols is equal to a mapping result of HARQ-ACKs and modulation symbols for one or more data blocks received on a single downlink carrier on the basis of one or more first HARQ-ACKs for one or more data blocks related to the primary cell, if one or more second HARQ-ACKs for one or more data block related to the secondary cell, except the one or more first HARQ-ACKs, are all NACK or DTX (Discontinuous Transmission).

The transmission of the plurality of HARQ-ACKs may be dropped if the one or more first HARQ-ACKs are all DTX and the second HARQ-ACKs are all NACK.

The primary cell may include a PCC (Primary Component Carrier) and the secondary cell may include a SCC (Secondary Component Carrier).

The uplink control channel may include a PUCCH (Physical Uplink Control Channel) and the downlink control channel may include a PDCCH (Physical Downlink Control Channel).

According to the present invention, uplink control information can be efficiently transmitted in a wireless communication system. Furthermore, control information, preferably, ACK/NACK information can be efficiently transmitted in a multi-carrier environment.

It will be appreciated by persons skilled in the art that the effects that can be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIGS. 13 to 24 show methods of transmitting ACK/NACK according to embodiments of the present invention.

DETAILED DESCRIPTION OF THE INVENTION

Techniques described herein can be used in various wireless access systems such as CDMA, FDMA, TDMA, OFDMA, SC-FDMA, etc. CDMA may be implemented with a radio technology such as Universal Terrestrial Radio Access (UTRA) or CDMA2000. TDMA may be implemented with a radio technology such as Global System for Mobile communication (GSM)/General Packet Radio Service (GPRS)/Enhanced Data Rates for GSM Evolution (EDGE). OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). $3^{rd}$ generation partnership project (3GPP) long term evolution (LTE) is a part of an evolved-UMTS (E-UMTS) using the E-URTA. The 3GPP LTE employs the OFDMA in downlink and employs the SC-FDMA in uplink. LTE-advanced (LTE-A) is an evolution of 3GPP LTE.

For clarity, this application focuses on 3GPP LTE/LTE-A. However, technical features of the present invention are not limited thereto. Furthermore, specific terminology used in the following description is provided to help understand the present invention and may be changed to other forms within the technical spirit of the present invention.

Figure 1:
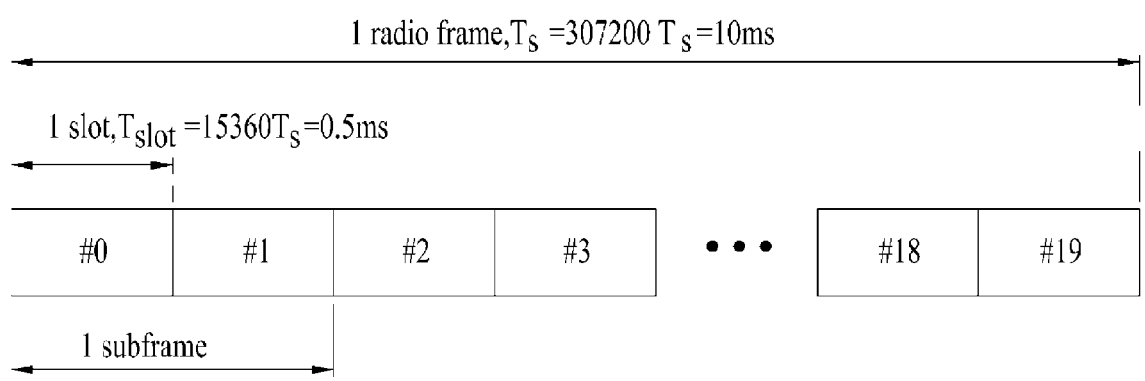
FIG. 1 shows an exemplary radio frame structure.

FIG. 1 shows a structure of a radio frame.

Referring to FIG. 1, a radio frame includes 10 subframes. A subframe includes two slots in the time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) or single carrier frequency division multiple access (SC-FDMA) symbols in the time domain. Since the LET uses OFDMA in the downlink and uses SC-FDMA in the uplink, the OFDM or SC-FDMA symbol represents one symbol period. A resource block (RB) is a resource allocation unit and includes a plurality of contiguous subcarriers in one slot. The structure of the radio frame is shown for exemplary purposes only. Thus, the number of subframes included in the radio frame or the number of slots included in the subframe or the number of symbols included in the slot may be modified in various manners.

Figure 2:
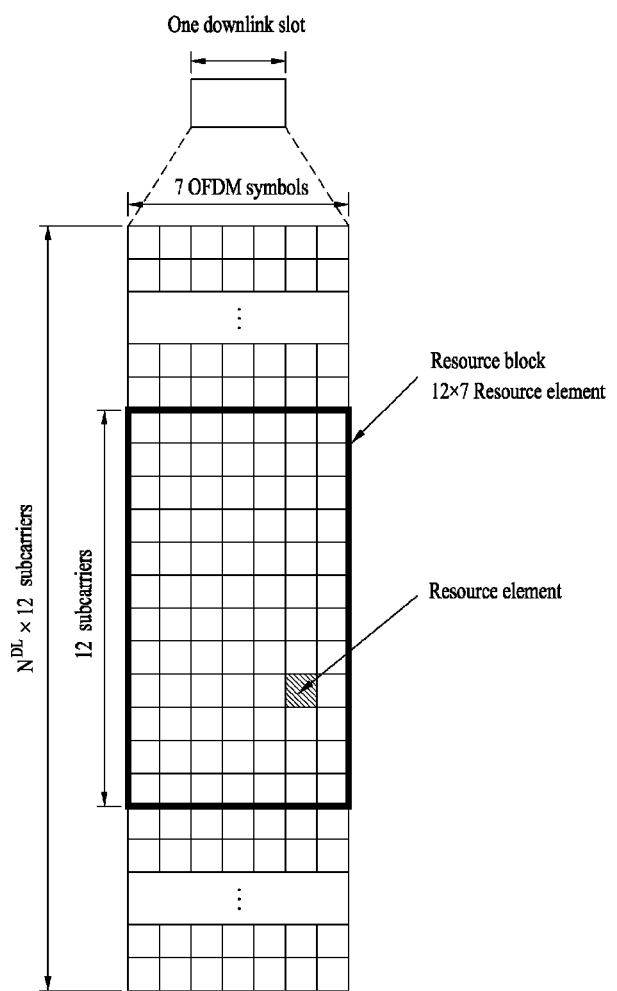
FIG. 2 shows a resource grid of a downlink slot.

FIG. 2 shows a resource grid for a downlink slot.

Referring to FIG. 2, a downlink slot includes a plurality of OFDM symbols in the time domain. It is described herein that one downlink slot may include 7(6) OFDM symbols, and one RB may include 12 subcarriers in frequency domain as an example. Each element on the resource grid is referred to as a resource element (RE). One RB includes 12x7(6) REs. The number NRB of RBs included in the downlink slot depends on downlink transmit bandwidth. Though the structure of an uplink slot may be same as that of the downlink slot, OFDM symbols are replaced with SC-FDMA symbols.

Figure 3:
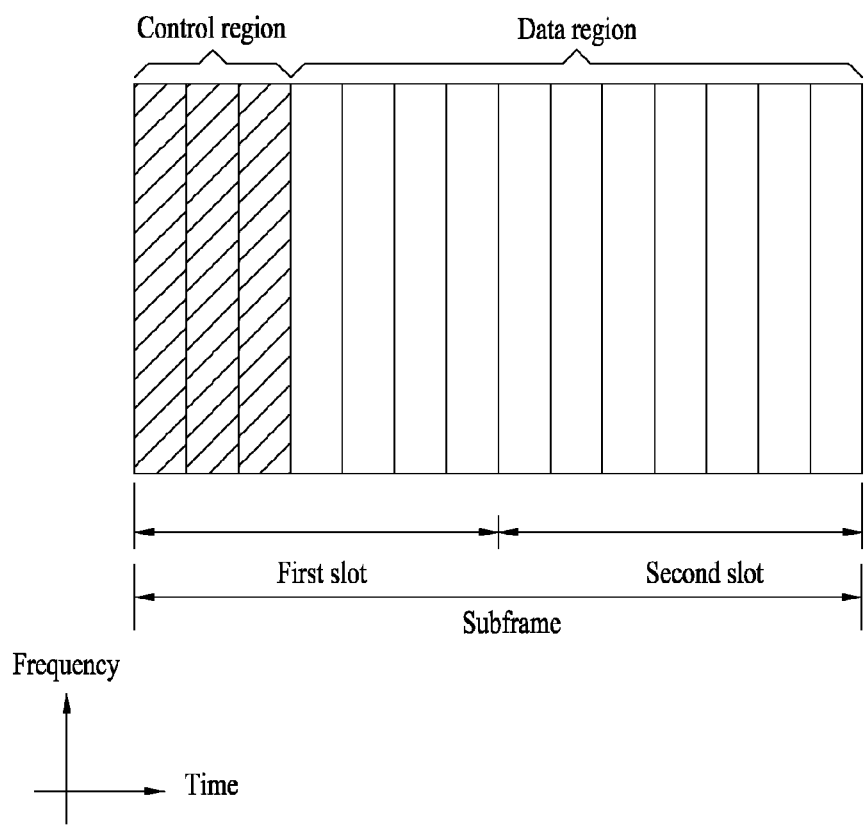
FIG. 3 shows a downlink subframe structure.

FIG. 3 shows a structure of a downlink subframe.

Referring to FIG. 3, a maximum of three (four) OFDM symbols located in a front portion of a first slot within a subframe correspond to a control region to be assigned with a control channel. The remaining OFDM symbols correspond to a data region to be assigned with a physical downlink shared channel (PDSCH). The PDSCH is used to carry a transport block (TB) or a codeword (CW) corresponding to the transport block. The TB means a data block transmitted from a MAC layer to a PHY layer through a transmission channel. The CW corresponds to a coded version of the TB. The relationship between the TB and CW may depend on swapping. In the specification, PDSCH, transport block and codeword are used in a mixed manner. Examples of downlink control channels used in the LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgement (ACK)/not-acknowledgement (NACH) signal.

Control information transmitted through the PDCCH is referred to as downlink control information (DCI). The DCI includes resource allocation information and other control information for a user equipment (UE) or UE group. For example, the DCI includes uplink/downlink scheduling information, an uplink transmit (Tx) power control command, etc. Information regarding transmission modes and DCI formats for constructing a multi-antenna technique are as follows.

Transmission Mode
  Transmission mode 1: Transmission from a single base station antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO
  Transmission mode 6: Closed-loop rank-1 precoding
  Transmission mode 7: Transmission using UE-specific reference signals DCI Formats
  Format 0: Resource grants for PUSCH transmission (uplink)
  Format 1: Resource assignments for single codeword PDSCH transmission (transmission modes 1, 2 and 7)
  Format 1A: Compact signaling of resource assignments for single codeword PDSCH (all modes)
  Format 1B: Compact resource assignments for PDSCH using rank-1 closed loop precoding (mode 6)
  Format 1C: Very compact resource assignments for PDSCH (e.g. paging/broadcast system information)
  Format 1D: Compact resource assignments for PDSCH using multi-user MIMO (mode 5)
  Format 2: Resource assignments for PDSCH for closed-loop MIMO operation (mode 4)
  Format 2A: Resource assignments for PDSCH for open-loop MIMO operation (mode 3)
  Format 3/3A: Power control commands for PUCCH and PUSCH with 2-bit/1-bit power adjustment As described above, the PDSCH may carry a transport format and resource allocation information of a downlink shared channel (DL-SCH), a transport format and resource allocation information of an uplink shared channel (UL-SCH), paging information on a paging channel (PCH), system information on the DL-SCH, resource allocation information of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. A UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the PDCCH are determined according to the number of CCEs. A base station (BS) determines PDCCH format according to a DCI to be transmitted to the UE, and attaches a cyclic redundancy check (CRC) to control information. The CRC is masked with an identifier (referred to as a radio network temporary identifier (RNTI)) according to an owner or usage of the PDCCH. If the PDCCH is for a specific UE, for example, an identifier (e.g., cell-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), system information RNTI (SI-RNTI) may be masked to the CRC. If the PDCCH is for a random access response, random access-RNTI (RA-RNTI) may be masked to the CRC.

Figure 4:
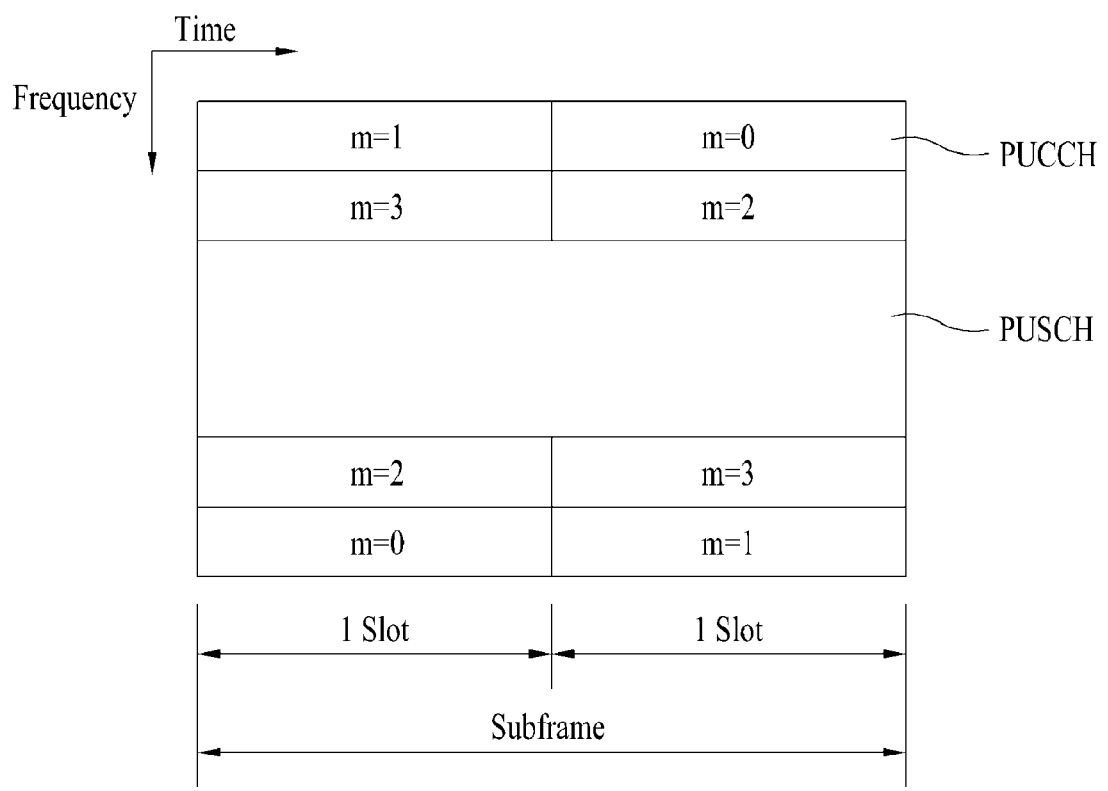
FIG. 4 shows an uplink subframe structure.

FIG. 4 shows a structure of an uplink subframe used in LTE.

Referring to FIG. 4, the uplink subframe includes a plurality of slots (for example, two slots). A slot may includes a number of SC-FDMA symbols depending on CP length. The uplink subframe is divided in a frequency domain into a control region and a data region. The data region includes a PUSCH and is used to transmit a data signal such as a voice signal, etc. The control region includes a PUCCH and is used to transmit uplink control information (UCI). The PUCCH includes an RB pair located at both ends of the data region in the frequency domain and hops based on the slots.

The PUCCH can be used to transmit the following control information.

Scheduling Request (SR): Information used to request uplink UL-SCH resources, which is transmitted using on-off keying (OOK).

HARQ ACK/NACK: A response to downlink data packets on PDSCH, which indicates whether the downlink data packets have been successfully received. One ACK/NACK bit is transmitted in response to a single downlink codeword and two ACK/NACK bits are transmitted in response to two downlink codewords.

Channel Quality Indicator (CQI): Feedback information regarding a downlink channel. MIMO-related feedback information includes a rank indicator (RI) and a precoding matrix indicator (PMI). 20 bits are used for each subframe.

The amount of control information which a UE can transmit in a subframe depends on the number of SC-FDMA symbols available for transmission of control information. The SC-FDMA symbols available for transmission of control information correspond to SC-FDMA symbols excluding SC-FDMA symbols used for reference signal transmission in a subframe. In the case of a subframe for which a sounding reference signal (SRS) is set, even the last SC-FDMA symbol of the subframe is excluded. The reference signal is used to detect coherency of the PUCCH. The PUCCH supports seven different formats depending on the information to be signaled.

Table 1 shows the mapping between the PUCCH format and UCI supported in the LTE.

TABLE 1

| PUCCH format | Uplink Control Information (UCI) |
|---|---|
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
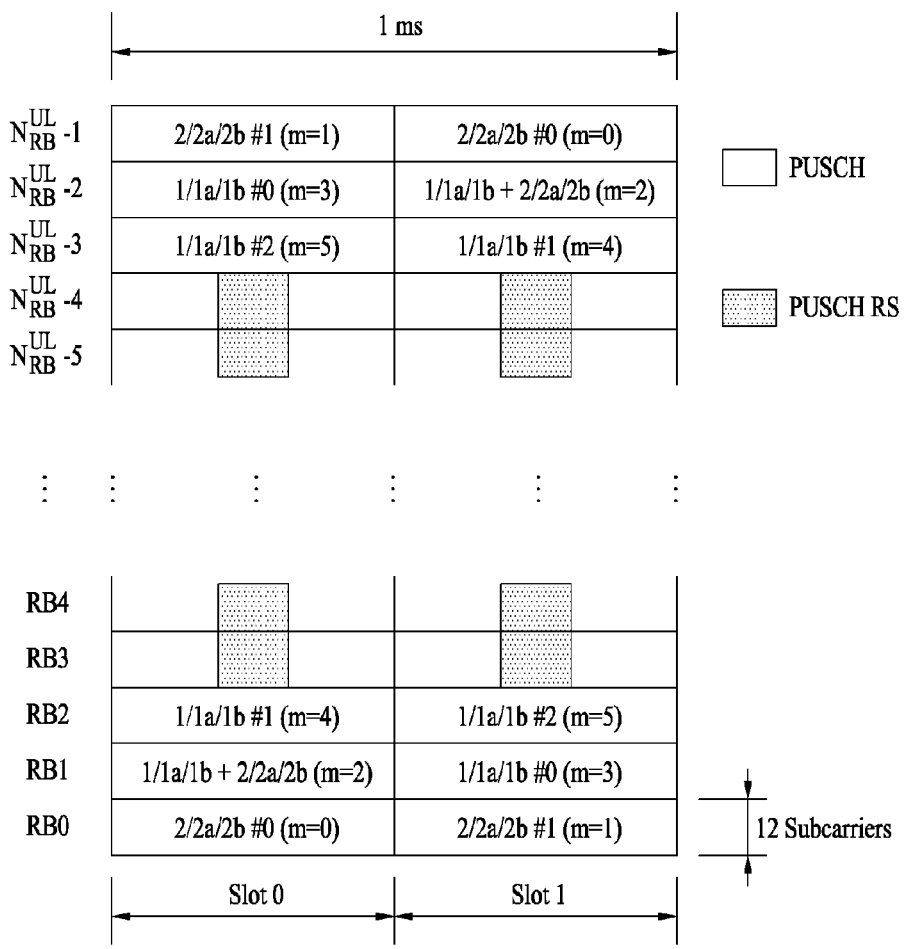
FIG. 5 shows an example of physically mapping PUCCH formats to PUCCH regions.

FIG. 5 shows an example of physical mapping of PUCCH formats to PUCCH regions.

Referring to FIG. 5, PUCCH CQI formats 2/2a/2b are mapped and transmitted on the band-edge RBs (e.g. PUCCH region m=0, 1) followed by a mixed PUCCH RB (if present, e.g. region m=2) of CQI format 2/2a/2b and SR/HARQ ACK/NACK format 1/1a/1b, and then by PUCCH SR/HARQ ACK/NACK format 1/1a/1b (e.g. m=3, 4, 5). The number of PUCCH RBs available for use by PUCCH CQI format 2/2a/2b is indicated to the UEs in the cell by broadcast signaling.

The periodicity and frequency resolution to be used by a UE to report CQI are both controlled by the BS. In the time domain, both periodic and aperiodic CQI reporting are supported. The PUCCH format 2 is used for periodic CQI reporting only. However, if a PUSCH is scheduled for a subframe supposed to transmit a CQI, the CQI is fed back to data and then transmitted through the PUSCH. The PUSCH is used for aperiodic reporting of the CQI. For this, the BS instructs the UE to send an individual CQI report embedded into a resource (that is, PUSCH) which is scheduled for uplink data transmission.

Figure 6:
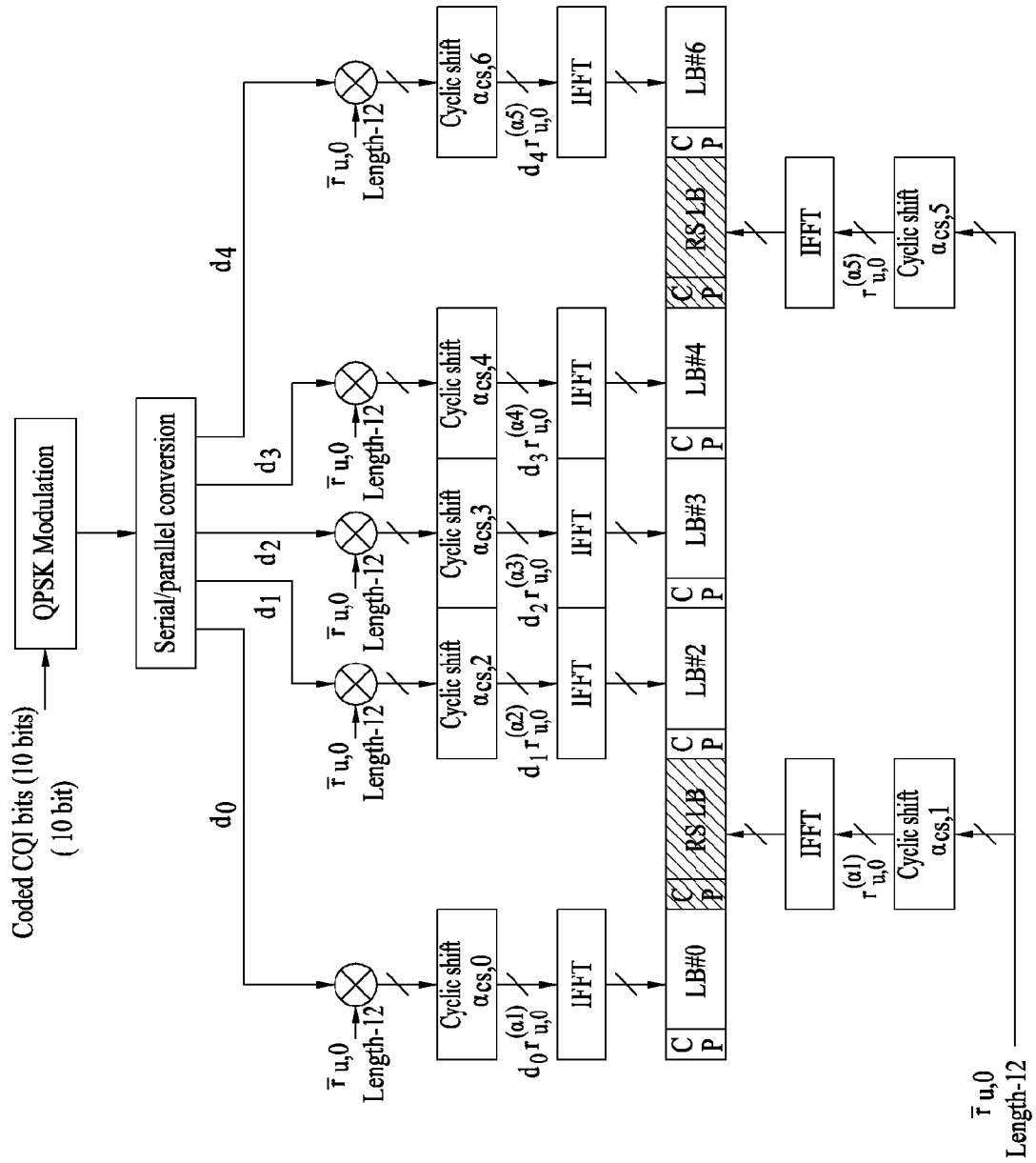
FIG. 6 shows a slot level structure of PUCCH format 2/2a/2b.

FIG. 6 shows a slot level structure of PUCCH format 2/2a/2b. The PUCCH format 2/2a/2b is used for CQI transmission. SC-FDMA symbols 1 and 5 are used for demodulation reference signal (DM RS) transmission in a slot in the case of normal cyclic prefix (CP). In the case of extended CP, only SC-FDMA symbol 3 is used for DM RS transmission in the slot.

Referring to FIG. 6, 10 CQI information bits are channel coded with a rate 1/2 punctured (20, k) Reed-Muller code to give 20 coded bits (not shown), which are then scrambled (not shown) prior to quadrature phase shift keying (QPSK) constellation mapping. The coded bits may be scrambled in a similar way to PUSCH data with a length-31 Gold sequence. 10 QPSK modulated symbols are generated and 5 QPSK modulated symbols d0 to d4 are transmitted in each slot through corresponding SC-FDMA symbols. Each QPSK modulated symbol is used to modulate a base RS sequence $(r_u, 0)$ of length-12 prior to Inverse Fast Fourier Transform (IFFT). Consequently, the RS sequences are cyclic shifted $(d_x * r_{u,0}, x=0$ to 4) according to QPSK modulated symbol values in the time domain. The RS sequences multiplied by the QPSK modulated symbol values are cyclic shifted $(\alpha_{cs,x}, x=1, 5)$. When the number of cyclic shifts is N, N UEs can be multiplexed on the same CQI PUCCH RB. The DM RS sequence is similar to the frequency domain CQI sequence but without the CQI data modulation.

Parameters/resources for periodic CQI reporting are semi-statically configured by higher layer signaling. For example, if PUCCH resource index $n^{(2)}_{PUCCH}$ is set for CQI transmission, the CQI is periodically transmitted on the CQI PUCCH linked to the PUCCH resource index $n^{(2)}_{PUCCH}$. The PUCCH resource index $n^{(2)}_{PUCCH}$ indicates the PUCCH RB and cyclic shift $\alpha_{cs}$.

Figure 7:
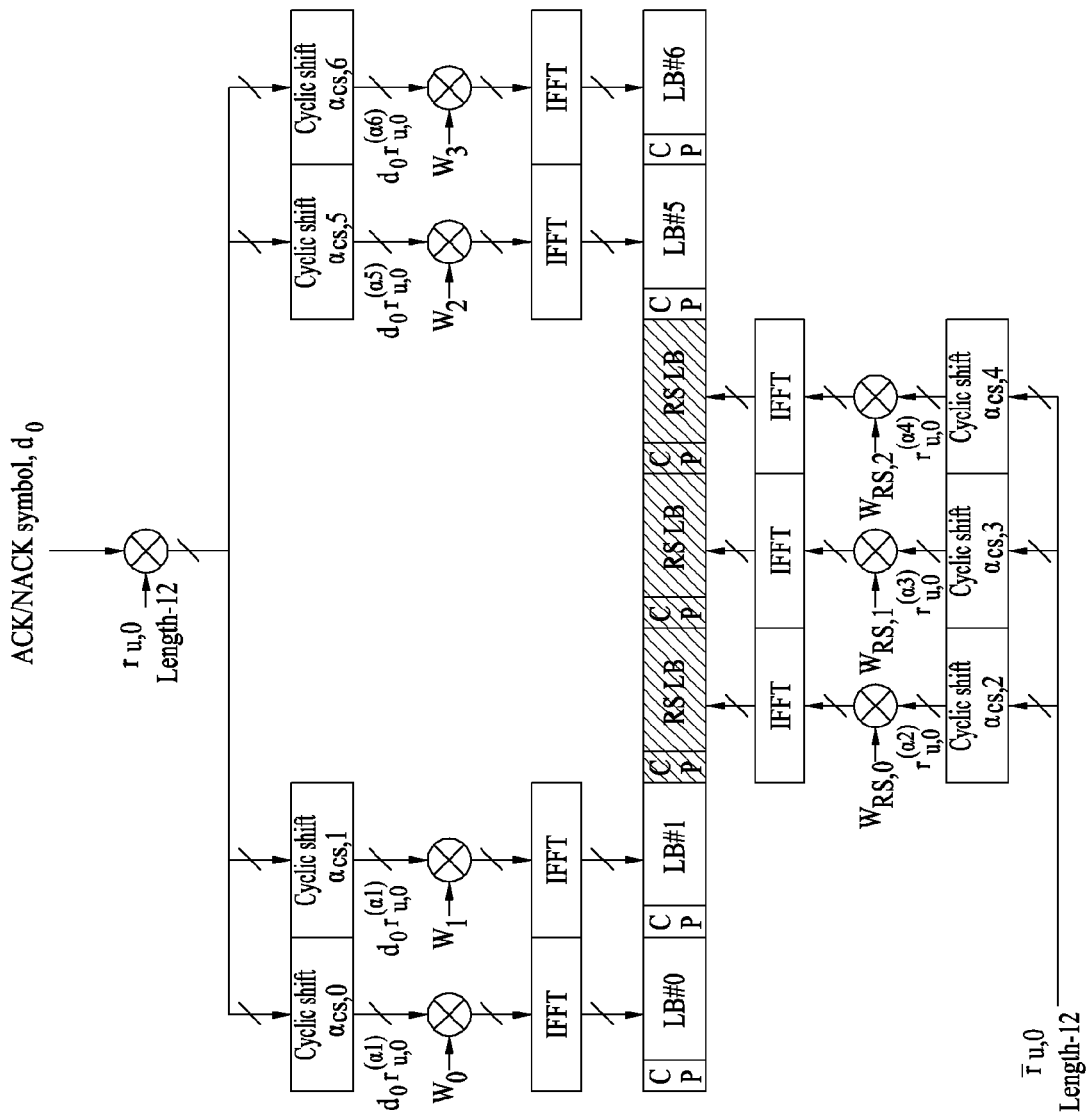
FIG. 7 shows a slot level structure of PUCCH format 1a/1b.

FIG. 7 shows a slot level structure of PUCCH format 1a/1b. The PUCCH format 1a/1b is used for ACK/NACK transmission. SC-FDMA symbols 2, 3 and 4 are used for DM RS transmissions in the case of normal CP. In the case of extended CP, SC-FDMA symbol 2 and 3 are used for DM RS transmission. Accordingly, four SC-FDMA symbols are used for ACK/NACK transmission in one slot. The PUCCH format 1a/1b is referred to as PUCCH format 1 for convenience.

Referring to FIG. 7, one ACK/NACK information bit [b(o)] and two ACK/NACK information bits [(b0)b(1)] are modulated using BPSK and QPSK modulation respectively, resulting in a single HARQ ACK/NACK modulation symbol. Each bit [b(i), i=0, 1] in the ACK/NACK information represents a HARQ response to a corresponding DL transport block. A positive ACK is encoded as a binary '1' and a negative ACK (NACK) as a binary '0'. Table 2 shows a modulation table defined for the PUCCH formats 1a and 1b in LTE.

TABLE 2

| PUCCH format | $b(0), \ldots, b(M_{bit} - 1)$ | d(0) |
|---|---|---|
| 1a | 0 | 1 |
|  | 1 | -1 |
| 1b | 00 | 1 |
|  | 01 | -j |
|  | 10 | j |
|  | 11 | -1 |

In addition to the cyclic time shift $(\alpha_{cs,x})$ in the frequency domain as in the CQI case above, the PUCCH formats 1a/1b perform time domain spreading using orthogonal (Walsh-Hadamard or DFT) spreading codes w0, w1, w2 and w3. Since code multiplexing is used in both the frequency and time domains in the case of PUCCH format 1a/1b, a large number of UEs can be multiplexed on the same PUCCH RB.

RSs transmitted from different UEs are multiplexed in the same way as UCI. The number of cyclic shifts supported in an SC-FDMA symbol for PUCCH ACK/NACK RBs is configurable by a cell-specific higher-layer signaling parameter $\Delta^{PUCCH}_{shift} \in \{1, 2, 3\}$, indicating 12, 6, or 4 shifts respectively. For the time-domain CDM, the number of spreading codes for ACK/NACK data is limited by the number of RS symbols, as the multiplexing capacity of RS symbols is smaller than that of USI symbols due to smaller number of RS symbols.

Figure 8:
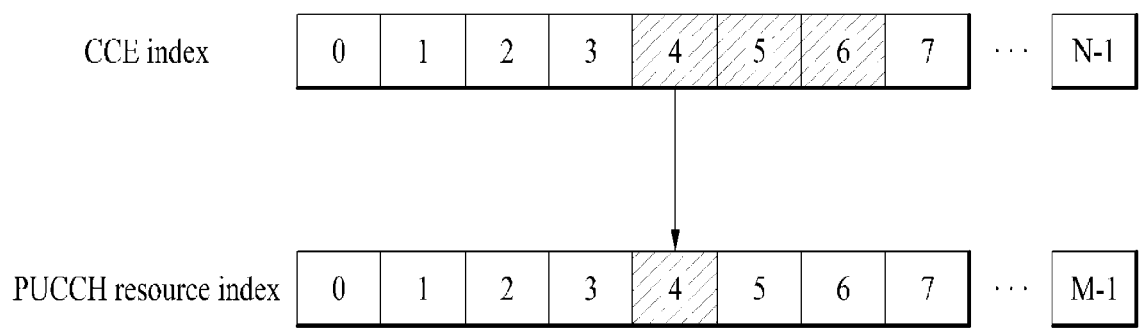
FIG. 8 shows an example of determining PUCCH resources for ACK/NACK.

FIG. 8 shows an example of determining PUCCH resources for ACK/NACK information. A PUCCH resource for ACK/NACK information is not allocated to each UE in the cell in advance in the LTE system, and a plurality of UEs in the cell share a plurality of PUCCH resources at each point of time. Specifically, a PUCCH resource that a UE uses to transmit the ACK/NACK information corresponds to a PDCCH that carries scheduling information regarding corresponding downlink data. A region in which the PDCCH is transmitted in each downlink subframe is configured with a plurality of control channel elements (CCEs), and the PDCCH transmitted to the UE is configured with one or more CCEs. The UE transmits the ACK/NACK information through the PUCCH resource corresponding to a specific CCE (e.g. first CCE) among the CCEs constructing the PDCCH received by the UE.

Referring to FIG. 8, blocks in a downlink component carrier (DL CC) indicate CCEs and blocks in an uplink component carrier (UL CC) indicate PUCCH resources. Each PUCCH index corresponds to a PUCCH resource for ACK/NACK information. If information about a PDSCH is transmitted through the PDCCH consisting of CCEs 4, 5 and 6, as shown in FIG. 8, the UE transmits the ACK/NACK information through the PUCCH 4 corresponding to the CCE 4 that is the first CCE. FIG. 8 shows an exemplary case in which the UL CC has a maximum of M PUCCHs when the DL CC has a maximum of N CCEs. Although N may equal M, it can be possible to design the system such that M is different from N and to overlap mappings of the CCEs and PUCCHs.

Specifically, the PUCCH resource index in the LTE system is determined as follows.

$$n^{(1)}_{PUCCH} = n_{CCE} + N^{(1)}_{PUCCH} \quad \text{Equation 1}$$

Here, $n^{(1)}_{PUCCH}$ represents a resource index of the PUCCH format 1 for ACK/NACK/DTX transmission, $N^{(1)}_{PUCCH}$ represents a signaling value transmitted from a higher layer, and $n_{CCE}$ represents the lowest value among CCE indexes used for PDCCH transmission. Cyclic shifts, orthogonal spreading codes and physical resource block (PRB) for the PUCCH format 1a/1b are derived from the $n^{(1)}_{PUCCH}$.

When the LTE system operates in TDD, the UE transmits one multiplexed ACK/NACK signal for a plurality of PDSCHs received through subframes at different time points. Specifically, the UE transmits one multiplexed ACK/NACK signal for a plurality of PDSCHs using PUCCH selection. In the PUCCH selection, the UE occupies a plurality of uplink physical channels to transmit the multiplexed ACK/NACK signal when receiving a plurality of downlink data signals. When the UE receives a plurality of PDSCHs, for example, the UE can occupy the same number of PUCCHs as the number of the PDSCHs using specific CCEs of the PUCCHs, which indicate the PDSCHs. In this case, the UE can transmit the multiplexed ACK/NACK signal using a combination of information on which one of the occupied PUCCHs is selected and modulated/coded information applied to the selected PUCCH.

Table 3 shows a PUCCH selection method defined in the LTE system.

TABLE 3

| ACK(0), ACK(1), ACK(2), ACK(3) | $n^{(1)}_{PUCCH,X}$ | b(0), b(1) |
|---|---|---|
| | Subframe | |
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 3, ACK(i) indicates the HARQ ACK/NACK/DTX result for an i-th data unit ($0 \leq i \leq 3$). Discontinuous transmission (DTX) means that there is no data unit transmitted for corresponding ACK(i) or the UE does not detect the existence of the data unit corresponding to HARQ-ACK(i). The UE can occupy a maximum of four PUCCH resources (i.e., $n^{(1)}_{PUCCH,0}$ to $n^{(1)}_{PUCCH,3}$) for each data unit. The multiplexed ACK/NACK signal is transmitted through one PUCCH resource selected from among the occupied PUCCH resources. In Table 3, $n^{(1)}_{PUCCH,X}$ indicates the PUCCH resource which should be used in actual ACK/NACK transmission, and b(0)b(1) indicates two bits carried by the selected PUCCH resource, which is modulated using QPSK. If the UE decodes four data units successfully, the UE should transmit two bits (1, 1) to the BS using PUCCH resource $n^{(1)}_{PUCCH,1}$. Since combinations of PUCCH resources and QPSK symbols cannot represent all of available ACK/NACK, NACK and DTX are coupled (NACK/DTX, N/D) except in some cases.

Figure 9:
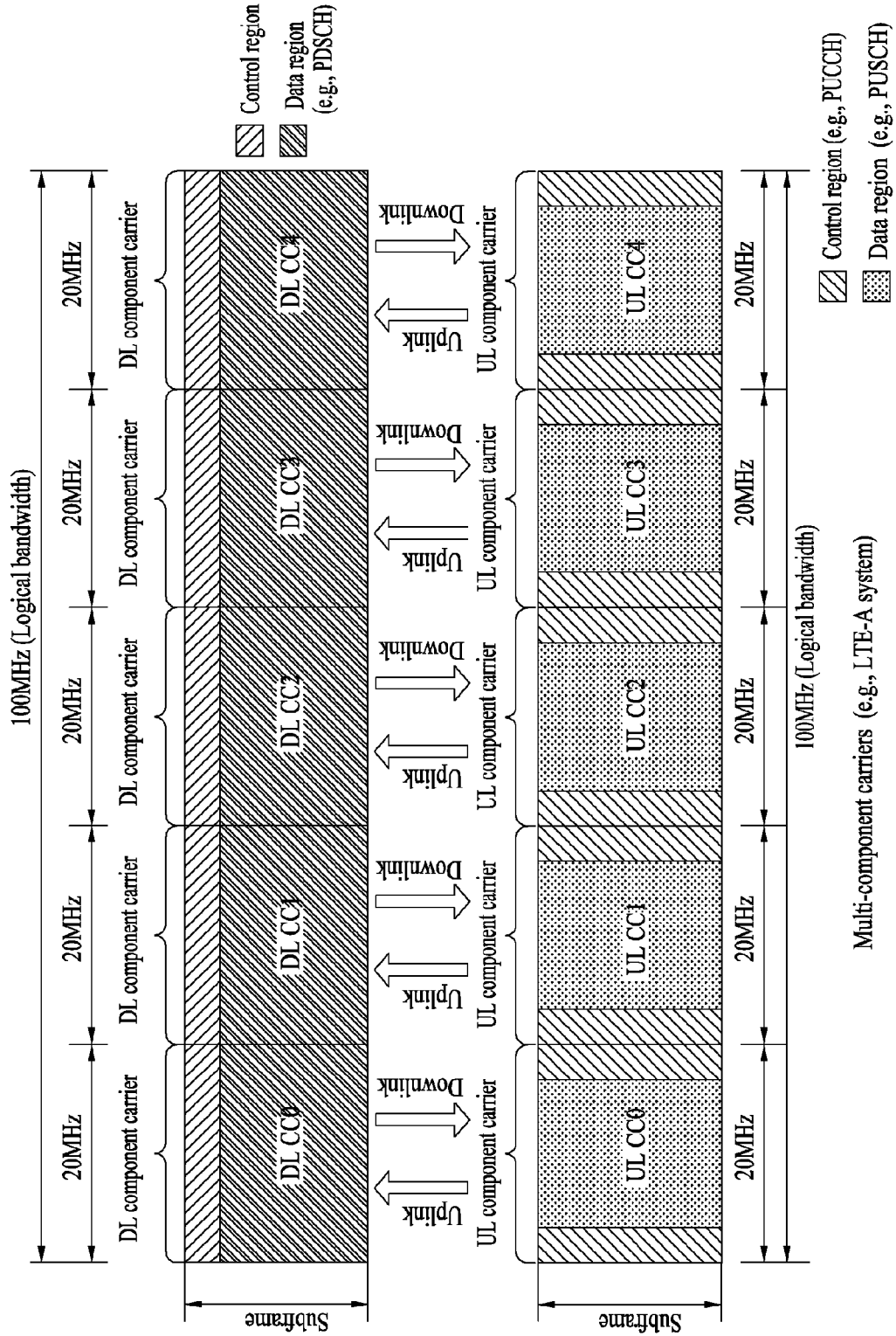
FIG. 9 shows a carrier aggregation communication system.

FIG. 9 shows a carrier aggregation (CA) communication system. The LTE-A system uses carrier aggregation or bandwidth aggregation that uses a wider uplink/downlink bandwidth by aggregating a plurality of uplink/downlink frequency blocks for a wider frequency band. Each frequency block is transmitted using a component carrier (CC). The component carrier may be understood as a carrier frequency (or center carrier, center frequency) for the corresponding frequency block.

Referring to FIG. 9, a wider uplink/downlink bandwidth can be supported by aggregating a plurality of uplink/downlink CCs. The CCs may be contiguous or noncontiguous in the frequency domain. The bandwidths of the CCs can be independently determined Asymmetrical carrier aggregation in which the number of UL CCs differs from the number of DL CCs may be used. In the case of two DL CCs and one UL CC, for example, they may be configured such that the DL CCs and UL CC correspond to each other 2:1. The DL CC/UL CC link may be fixed to the system or semi-statically configured. Furthermore, even if the entire system bandwidth is configured with N CCs, a frequency band that a specific UE can monitor/receive may be limited to M (<N) CCs. Various parameters regarding carrier aggregation may be set cell-specifically, UE group-specifically, or UE-specifically. Meanwhile, control information may be configured such that the control information can be transmitted and received only through a specific CC. This specific CC may be designated as a primary CC (PCC) (or anchor CC) and other CCs may be designated as secondary CC (SCCs).

LTE-A uses the concept of cells to manage radio resources. The cell is defined as a combination of downlink and uplink resources. Here, the uplink resource is not an essential component. Accordingly, the cell can be configured with the downlink resource alone, or with both the downlink resource and uplink resource. When carrier aggregation is supported, linkage between a downlink resource carrier frequency (or DL CC) and an uplink resource carrier frequency (or UL CC) may be designated by system information. A cell that operates on the primary frequency (or PCC) may be designated as a primary cell (Pcell) and a cell that operates on the secondary frequency (or SCC) is designated as a secondary cell (SCell). The PCell is used for the UE to perform initial connection establishment or connection re-establishment. PCell may represent a cell designated during a handover process. The SCell is configurable after RRC connection establishment and may be used to provide additional radio resources. The PCell and SCell may be commonly designated as a serving cell. Accordingly, for a UE that is in an RRC_CONNECTED state without carrier aggregation or does not support carrier aggregation, only one serving cell configured with only the PCell exists. On the other hand, for a UE in an RRC_CONNECTED state, for which carrier aggregation is set, one or more serving cells including the PCell and SCell exist. For carrier aggregation, a network may configure one or more SCells for a UE that supports carrier aggregation in addition to the PCell initially configured in the connection establishment process after initial security activation.

Figure 10:
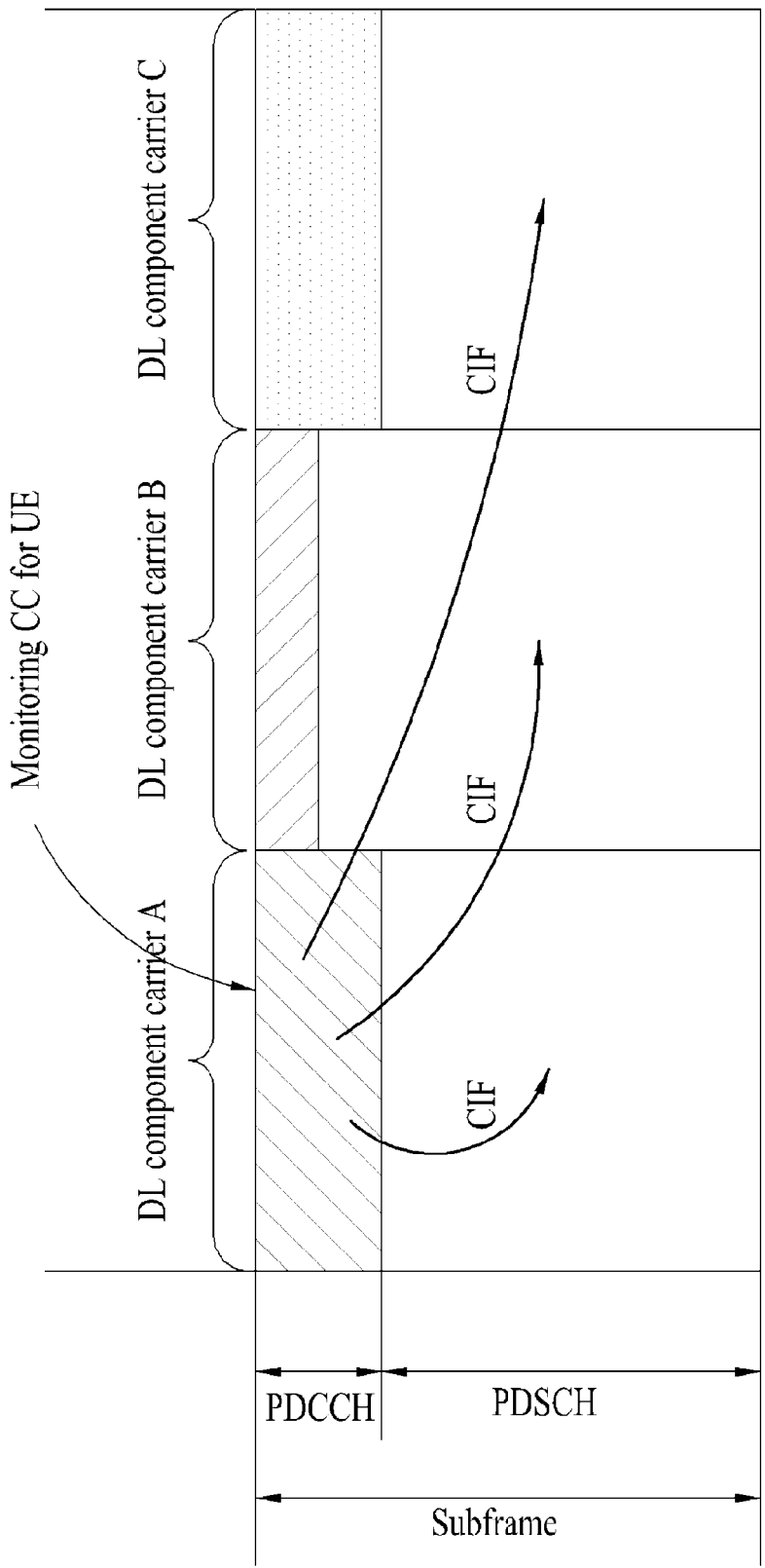
FIG. 10 shows scheduling in the case of aggregation of multiple carriers.

FIG. 10 illustrates scheduling when a plurality of carriers is aggregated. It is assumed that three DL CCs are aggregated and DL CC A is set to PDCCH CC. DL CCs A, B and C may be designated as serving CCs, serving carriers, and serving cells. When a CIF is disabled, each DL CC can transmit only the PDCCH scheduling its own PDSCH without the CIF, by following the LTE PDCCH principle. On the other hand, if the CIF is enabled by UE-specific (or UE-group-specific or cell-specific) higher layer signaling, the DL CC A (PDCCH CC) can transmit the PDCCHs scheduling not only its own PDSCH but also PDSCHs of the other CCs, by using the CIF. In this case, no PDCCH is transmitted on the DL CCs B and C which are not configured as the PDCCH CCs. Accordingly, the DL CC A (PDCCH CC) must include all of a PDCCH search space related to the DL CC A, a PDCCH search space related to the DL CC B and a PDCCH search space related to the DL CC C.

The LTE-A considers feedback of a plurality of ACK/NACK information/signals with respect to a plurality of PDSCHs transmitted through a plurality of DL CCs, through a specific UL CC (e.g. UL PCC or UL PCell). If the UE operates in Single User Multiple Input Multiple Output (SU-MIMO) in a certain DL CC to receive two codewords (or transport blocks), the UE needs to transmit a total of four feedback states of ACK/ACK, ACK/NACK, NACK/ACK, and NACK/NACK, or a maximum of five feedback states including DTX for the DL CC. If the DL CC is configured such that the DL CC supports a single codeword (or transport block), a maximum of three states of ACK, NACK, and DTX exist for the DL CC. If NACK is processed in the same manner as DTX, a total of two feedback states of ACK and NACK/DTX exist for the DL CC. Accordingly, if the UE aggregates a maximum of five DL CCs and operates in the SU-MIMO mode in all the CCs, the UE can have a maximum of $5^5$ transmittable feedback states, and an ACK/NACK payload size for representing the feedback states becomes 12 bits. If DTX is processed in the same manner as NACK, the number of feedback states becomes $4^5$ and an ACK/NACK payload size for representing the $4^5$ feedback states becomes 10 bits.

For this, it is discussed that a plurality of ACK/NACK information signals are channel coded (for example, Reed-Muller coded, Tail-biting convolutional coded, etc.), and then transmitted using the PUCCH format 2, or a new PUCCH format (for example, block-spreading based PUCCH format) in the LTE-A. Furthermore, it is discussed that a plurality of ACK/NACK information/signals are transmitted using the PUCCH format 1a/1b and ACK/NACK multiplexing (i.e., ACK/NACK selection) in the LTE-A.

The LTE TDD system uses implicit ACK/NACK selection that uses PDCCH resources (linked to a lowest CCE index) respectively corresponding to PDCCHs scheduling PDSCHs to secure PUCCH resources as an ACK/NACK multiplexing (i.e., ACK/NACK selection) method. However, if the implicit ACK/NACK selection is applied using PUCCH resources in different RBs, performance deterioration may occur. Accordingly, the LTE-A considers explicit ACK/NACK selection that uses reserved PUCCH resources, preferably, a plurality of PUCCH resources in the same RB or contiguous RBs, for each UE through RRC signaling.

However, when ACK/NACK information with respect to a plurality of CCs is transmitted using the explicit ACK/NACK selection, a plurality of explicitly reserved resources is used for ACK/NACK transmission although one CC is actually scheduled by the BS. For example, when only one DL CC (i.e., primary/anchor DL CC) linked to an ACK/NACK transmit UL CC among a plurality of DL CCs is scheduled, explicit PUCCH resources may be unnecessarily used even though implicitly designated (i.e., linked to the lowest CCE index transmitting PDCCH) PUCCH resources (i.e., PUCCH format 1a/1b) are available. More comprehensively, even if one or more CCs including the primary/anchor DL CC are simultaneously scheduled, a situation in which NACK or DTX is transmitted for CCs other than the primary/anchor DL CC may be generated. In this case, explicit PUCCH resources are also unnecessarily used.

The LTE-A can reconfigure carrier configuration, and thus ACK/NACK information inconsistency between the UE and BS may be generated. FIG. 10 illustrates operations of the BS and UE in a DL CC reconfiguration period.

Figure 11:
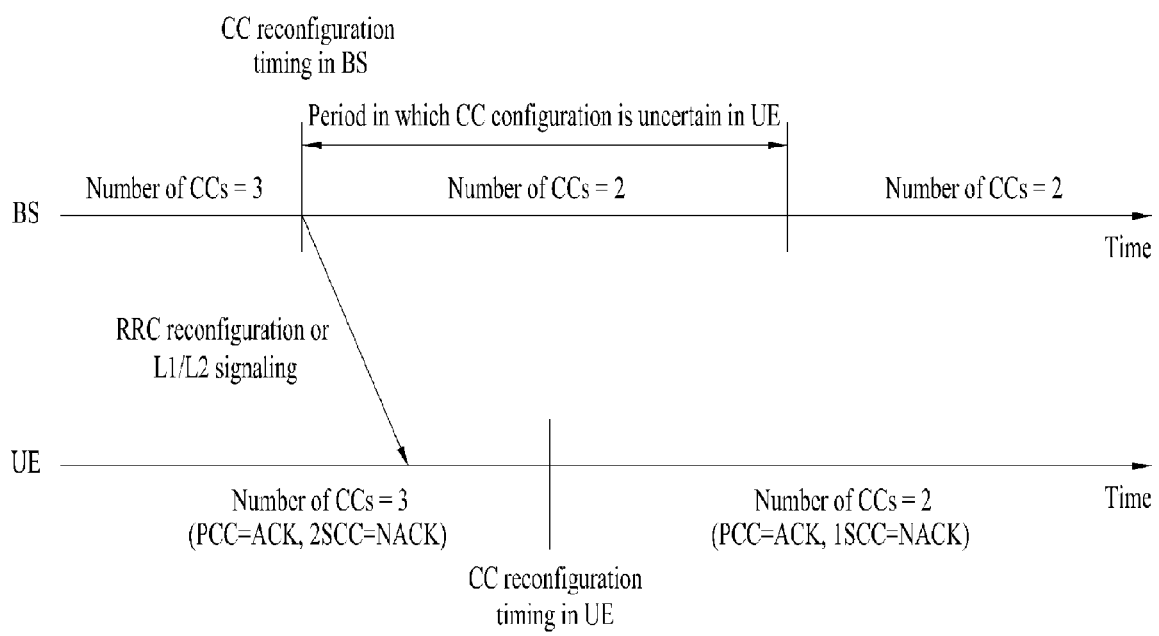
FIG. 11 shows operations of a base station and a user equipment in a DL CC change period.

Referring to FIG. 11, when the BS reconfigures DL CC(s) that the UE can use by RRC reconfiguration or L1/L2 control signaling, timings of applying the reconfigured DL CC(s) to the BS and UE may differs from each other. For example, if the BS changes the number of CCs that the UE can use from three to two, the time when the BS changes the number of DL CCs from three to two and transmits downlink data may be different from the time when the UE changes the number of serving DL CCs from three to two. Furthermore, even though the BS instructs the UE to change the number of CCs, a time period in which the number of DL CCs that the UE knows is different from the number of DL CCs that the BS knows may be generated if the UE fails to receive the instruction from the BS.

Accordingly, the UE may transmit ACK/NACK information for three DL CCs to the BS although the BS expects ACK/NACK information for two DL CCs. On the contrary, the UE may transmit ACK/NACK information for two DL CCs to the BS though the BS expects ACK/NACK information for three DL CCs. When the UE transmits the ACK/NACK information for three DL CCs while the BS recognizes that the number of DL CCs is two, the BS attempts to demodulate the ACK/NACK information received from UE on the basis of the ACK/NACK information for two DL CCs. In this case, the ACK/NACK information cannot be correctly demodulated. That is, ACK/NACK information inconsistency between the BS and UE may be generated due to confusion of DL CC configuration.

A method for efficiently transmitting uplink control information, preferably ACK/NACK information when carriers (carriers, frequency resources, cells, etc.) are aggregated and a resource allocation method therefore will now be explained with reference to the attached drawings. For convenience of explanation, it is assumed that two CCs are configured for one UE in the following description. In addition, it is assumed that a maximum of one transport block (or codeword) can be transmitted in a subframe k of a CC when the CC is configured as being the non-MIMO mode. Furthermore, it is assumed that a maximum of m (for example, 2) transport blocks (or codewords) can be transmitted in the subframe k of a CC when the CC is configured as being the MIMO mode. It is possible to know whether a CC is configured as being the MIMO mode, by using a transmission mode configured by a higher layer. Moreover, it is assumed that one (non-MIMO) or m (MIMO) ACK/NACK information signals are generated depending on a transmission mode configured for the CCs irrespective of the number of actually transmitted transport blocks (or codewords).

In the specification, HARQ-ACK represents a reception response result for a data block, that is, ACK/NACK/DTX response (simply, ACK/NACK response). The ACK/NACK/DTX response represents ACK, NACK and DTX or NACK/DTX. In addition, "HARQ-ACK for a specific CC" or "HARQ-ACK of a specific CC" indicates ACK/NACK/DTX response (simply, ACK/NACK response) with respect to a data block (e.g. PDSCH) related to the CC (e.g. scheduled to the specific CC). Furthermore, an ACK/NACK state indicates a combination corresponding to a plurality of HARQ-ACK signals. Here, the PDSCH may be substituted with a transport block or codeword. In LTE-A, only self-carrier scheduling is possible for a DL PCC. Accordingly, the PDCCH that schedules the PDSCH on the DL PCC is transmitted only on the DL PCC. On the other hand, a DL SCC can be cross-carrier scheduled. Accordingly, the PDCCH that schedules the PDSCH on the DL SCC is transmitted (cross-carrier scheduled) on the DL PCC or transmitted (self-carrier scheduled) on the DL SCC.

To solve the aforementioned problem, when ACK/NACK selection is applied to transmit a plurality of ACK/NACK information signals for a plurality of CCs, the present invention suggests transmission of ACK/NACK using an implicit PUCCH resource (refer to Equation 1) linked to the PDCCH that schedules the DL PCC if NACK or DTX is set for all CCs (i.e., DL SCCs) (in other words, DL SCells) other than the DL PCC when one or more CCs including at least the DL PCC (in other words, DL PCell) are scheduled. In other words, in ACK/NACK state mapping design, an ACK/NACK state in which "A" or "N" is for the DL PCC (or each CW of the DL PCC) and "N/D" is for all DL SCCs (or each CW of DL SCCs) is restricted such that the ACK/NACK state uses an implicit PUCCH resource linked to the PDCCH for the DL PCC according to the scheme defined in LTE instead of an explicit PUCCH resource (for convenience's sake, referred to as "PCC fallback"). In case of PCC fallback, a PUCCH format used to transmit the ACK/NACK state and a modulation symbol transmitted through the PUCCH format may be restricted such that they conform to the scheme defined by the LTE. For example, ACK/NACK can be transmitted using the PUCCH format 1b illustrated in FIG. 7 and the modulation table (refer to Table 2) in case of PCC fallback.

More specifically, a case in which a PCC transmission mode is configured as being the non-MIMO mode (single CW) is explained first. Two ACK/NACK states in which "A" or "N" is for the PCC and "N/D" is for all SCCs (or each CW of SCCs) are assumed. In this case, the ACK/NACK states are mapped to two constellation points on an implicit PUCCH resource linked to the PDCCH that schedules the PCC. Here, the two constellation points for the ACK/NACK states may be restricted such that they correspond to two constellation points defined for PUCCH format 1a ACK/NACK transmission for transmission of single CW in a single CC. Alternatively, the two constellation points for the ACK/NACK states may be restricted such that they correspond to two constellation points for "AA" and "NN" among four constellation points defined for PUCCH format 1b ACK/NACK transmission in a single CC. That is, mapping points of the ACK/NACK states on the constellation are determined on the basis of "A" and "N" of the PCC. Preferably, the mapping points of the ACK/NACK states on the constellation are restricted such that "A" and "N" of the PCC are located at the same positions as "A" and "N" for the PUCCH format 1a or "AA" and "NN" for the PUCCH format 1b.

Next, a case in which the PCC transmission mode is configured as being the MIMO mode (e.g. two CWs or two TBs) is explained. Four ACK/NACK states in which "A+A", "A+N", N+N", or "N+N" is for the PCC and "N/D" is for all SCCs (or each CW of SCCs) are supposed. In this case, the ACK/NACK states are mapped to four constellation points on an implicit PUCCH resource linked to the PDCCH that schedules the PCC. Here, the four constellation points for the ACK/NACK states correspond to four constellation points defined for PUCCH format 1b ACK/NACK transmission with respect to transmission of two CWs in a single CC. Mapping points of the ACK/NACK states on the constellation are determined on the basis of "A" and "N" of each CW of the PCC. In the specification, "N" of the PCC includes NACK, DTX or NACK/DTX. Preferably, "A" and "N" of each CW of the PCC are mapped to the same positions as "A" and "N" of each CW for the PUCCH format 1b on the constellation.

Figure 12:
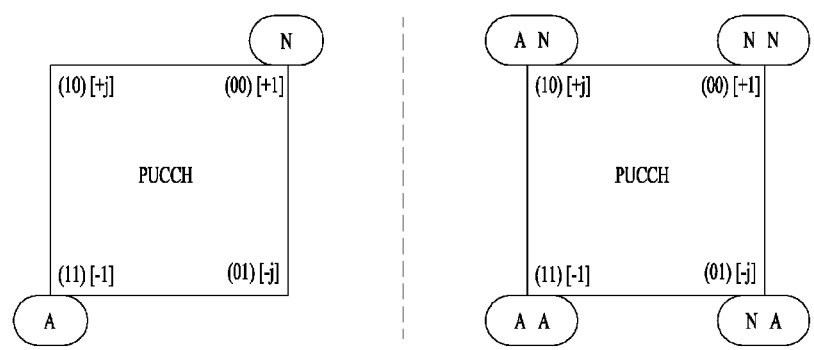
FIG. 12 shows a PUCCH format 1a/1b based ACK/NACK selection method according to LTE.
Figure 13:
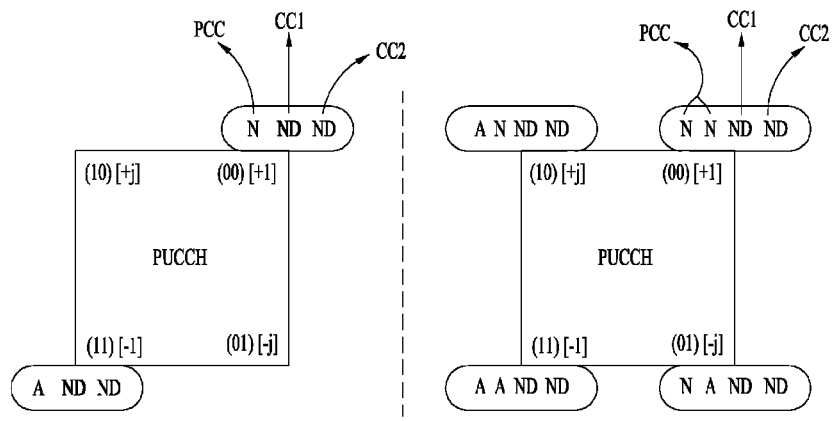

FIG. 12 illustrates a PUCCH format 1a/1b based ACK/NACK selection method for single CW/two CWs in a single CC according to LTE. FIG. 13 illustrates an ACK/NACK transmission method according to an embodiment of the present invention in the case that the PCC is configured to support the non-MIMO or MIMO transmission mode when three CCs (PCC, CC1 and CC2) are aggregated. For convenience's sake, it is assumed that SCCs (i.e., CC1 and CC2) are configured to support the non-MIMO mode in this embodiment.

Referring to FIGS. 12 and 13, "explicit ACK/NACK selection" is not applied to ACK/NACK states in which "A" or "N" is for the non-MIMO mode PCC and "N/D" is for all SCCs (that is, PCC fallback). That is, ACK/NACK states in which (PCC, CC1, CC2)=(A, N/D, N/D) and (N, N/D, N/D) are mapped to an implicit PUCCH resource linked to the PDCCH that schedules the PCC and transmitted. In this case, the mapping relationship between the ACK/NACK states and constellation points conforms to the LTE principle illustrated in FIG. 12.

Furthermore, "explicit ACK/NACK selection" is not applied to ACK/NACK states in which "A+A", "A+N", "N+A, or "N+N" is for the MIMO mode PCC and "N/D" is for all the SCCs (That is, PCC fallback). In this case, the mapping relationship between the ACK/NACK states and constellation points conforms to the LTE principle illustrated in FIG. 12 on the basis of ACK/NACK for the PCC. That is, the ACK/NACK states in which (PCC CW1, PCC CW2, CC1, CC2)=(A, A, N/D, N/D), (A, N, N/D, N/D), (N, A, N/D, N/D), and (N, N, N/D, N/D) are mapped to the implicit PUCCH resource linked to the PDCCH that schedules the PCC and transmitted.

Even if the PCC is configured as being the MIMO mode, one or more PDSCHs transmitted on the PCC are scheduled through one PCC PDCCH. Accordingly, one implicit PUCCH resource is occupied for transmission of ACK/NACK related to the PCC.

Tables 4 and 5 show ACK/NACK state mapping tables. Tables 4 and 5 show some ACK/NACK states, in which PCC fallback is performed. The mapping relationship of PUCCH resources and bit values used to transmit other ACK/NACK states can be arbitrarily defined in the present invention. That is, the mapping relationship of PUCCH resources and bit values used to transmit the other ACK/NACK states is "don't care" in the present invention.

TABLE 4

| PCC HARQ-ACK(0) | SCC1 HARQ-ACK(1) | SCC2 HARQ-ACK(2) | b(0), ..., b($M_{bit}$ − 1) | d(0) |
|---|---|---|---|---|
| ACK | NACK/DTX | NACK/DTX | 1 (11) | −1 |
| NACK | NACK/DTX | NACK/DTX | 0 (00) | +1 |

Here, HARQ-ACK(0) indicates ACK/NACK/DTX response to a CW (or TB) of the PCC. HARQ-ACK(1) indicates ACK/NACK/DTX response to the SCC1 and HARQ-ACK(2) indicates ACK/NACK/DTX response to CW1 of the SCC2. The ACK/NACK/DTX response includes ACK, NACK, and DTX or NACK/DTX. In the PCC, NACK includes NACK, DTX or NACK/DTX. d[0] corresponding to an ACK/NACK state is transmitted using an implicit PUCCH resource, and the implicit PUCCH resource is linked to the PDCCH used for PCC CW (or TB) scheduling (refer to Equation 1). The PUCCH formats 1a/1b, preferably, the PUCCH format 1b can be used.

TABLE 5

| PCC | | | SCC1 | | |
|---|---|---|---|---|---|
| HARQ-ACK(0) | HARQ-ACK(1) | HARQ-ACK(2) | SCC2 HARQ-ACK(3) | b(0), ..., b($M_{bit}$ − 1) | d(0) |
| ACK | ACK | NACK/DTX | NACK/DTX | 11 | −1 |
| ACK | NACK | NACK/DTX | NACK/DTX | 10 | j |
| NACK | ACK | NACK/DTX | NACK/DTX | 01 | −j |
| NACK | NACK | NACK/DTX | NACK/DTX | 00 | 1 |

In Table 5, HARQ-ACK(0) indicates ACK/NACK/DTX response to CW1 (or TB1) of the PCC and HARQ-ACK(1) indicates ACK/NACK/DTX response to CW2 (or TB2) of the PCC. HARQ-ACK(2) indicates ACK/NACK/DTX response to the SCC1 and HARQ-ACK(3) indicates ACK/NACK/ DTX response to CW1 of the SCC2. The ACK/NACK/DTX response includes ACK, NACK, and DTX or NACK/DTX. In the PCC, NACK includes NACK, DTX or NACK/DTX. d(0) corresponding to an ACK/NACK state is transmitted using an implicit PUCCH resource, and the implicit PUCCH resource is linked to the PDCCH used for PCC CW (or TB) scheduling (refer to Equation 1). The PUCCH format 1b can be used.

FIG. 13 shows a case in which there are two SCCs configured to support the non-MIMO mode. FIG. 13 shows an exemplary case and the ACK/NACK transmission method according to the present invention is not affected by the number of SCCs and SCC transmission mode if ACK/NACK for all the SCCs is NACK/DTX. Accordingly, it is possible to prevent ACK/NACK resources from being wasted even though "explicit ACK/NACK selection" is employed. Furthermore, inconsistency of ACK/NACK information on the PCC can be solved even if there is CC configuration inconsistency between the BS and UE during a CC reconfiguration process.

Additionally, when the PCC ACK/NACK transmission method using the implicit PUCCH resources (that is, PCC fallback) is applied on the basis of the "explicit ACK/NACK selection", the present invention suggests a detailed ACK/NACK state mapping method on explicit PUCCH resources. For convenience of explanation, only a case in which two independent CCs are aggregated is supposed in the following description. However, the suggested method can be applied to three or more CCs. The two CCs correspond to the PCC and SCC. According to the proposed method of the present invention, the UE selects one of PUCCH resources depending on the A/N state and transmits b(0)b(1) (that is, d(0)) corresponding to the A/N state using the selected PUCCH resource. It is assumed that the PUCCH format 1b is used.

Figure 14A:
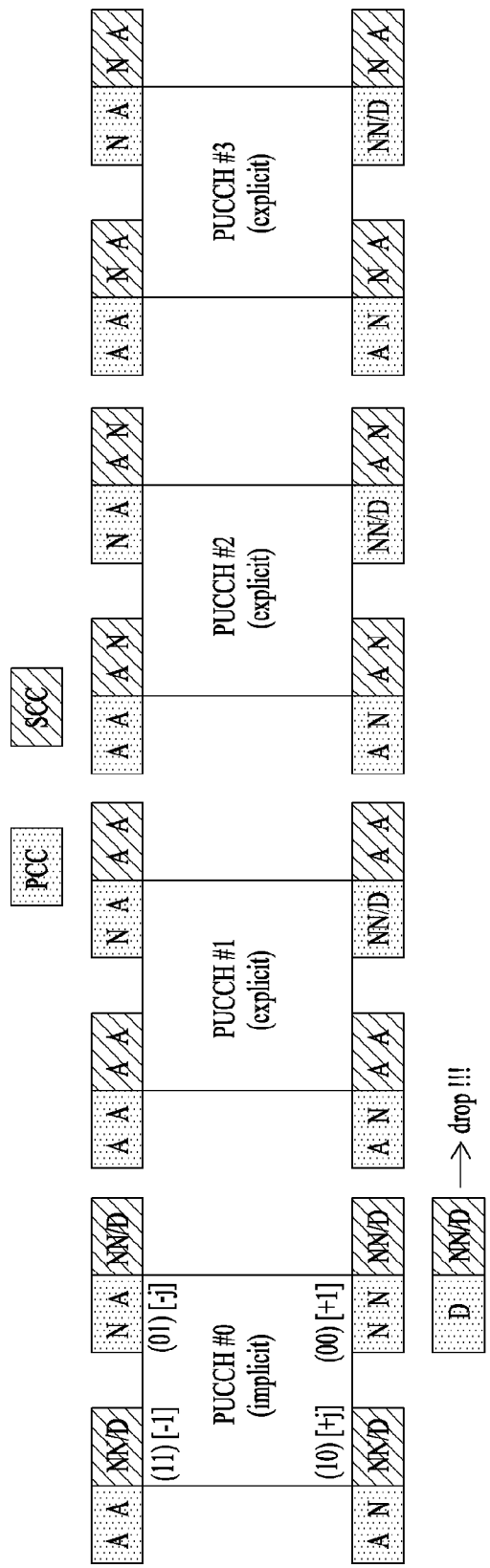
Figure 14B:
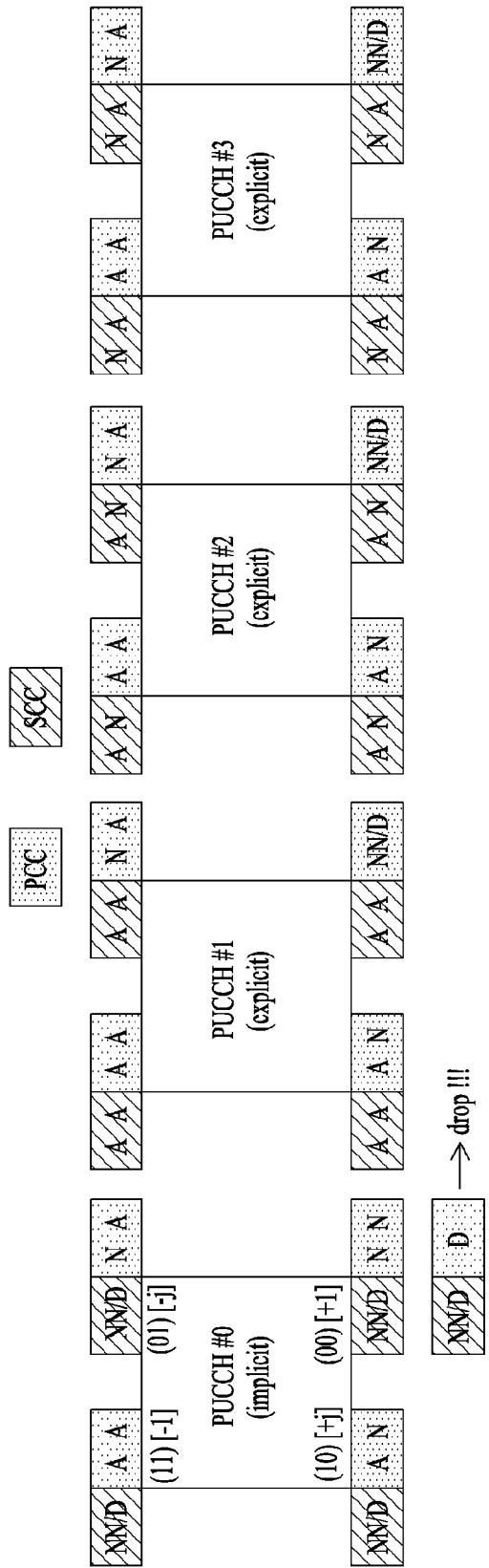

FIGS. 14a and 14b illustrate methods of mapping A/N states to one implicit PUCCH resource (PUCCH #0) and three explicit PUCCH resources (PUCCHs #1, #2 and #3) when both the PCC and SCC are set to the MIMO transmission mode (that is, four A/Ns need to be transmitted). The UE generates and transmits a PUCCH signal according to the shown mapping rule.

Referring to FIG. 14a, ACK/NACK (A/N) states are mapped to the implicit resource PUCCH #0 according to the aforementioned PCC fallback method. Distinctly, an A/N state in which "D" is for the PCC and "NN" or "D" is for the SCC, that is, (D, NN/D) is not transmitted. That is, the A/N state (D, NN/D) is not mapped to any implicit/explicit PUCCH resource. When this mapping method is generalized as "Method 1" for two or more CCs, transmission of A/N state in which "D" is for the PCC and "NN"/"D" (MIMO CC) or "N"/"D" (non-MIMO CC) is for all the remaining CCs is dropped. Consequently, different PCC A/N states are mapped to different constellation points on the implicit resource. All SCC A/N states correspond to NN/D on all the constellation points of the implicit resource.

The implicit resource mapping structure can be applied without being modified when the remaining A/N states are mapped to the three explicit PUCCHs #1, #2 and #3. Different PCC A/N states may be mapped to different constellation points on the explicit resources. In addition, PCC A/N states mapped to the same constellation point on different explicit resources may be the same. Furthermore, the same SCC A/N state may be mapped to all constellation points on an arbitrary explicit resource. Moreover, different SCC A/N states may be mapped to the same constellation points on different explicit resources. When this method is generalized as "Method 2" irrespective of implicit/explicit resources, different PCC A/N states may be mapped to different constellation points on each PUCCH resource. PCC A/N states mapped to the same constellation point on different PUCCH resources may be the same. For the SCC, the same SCC A/N state can be mapped to all constellation points on an arbitrary PUCCH resource. In addition, different SCC A/N states can be mapped to different PUCCH resources.

FIG. 14b illustrates an A/N state mapping method when the CC sequence (PCC, SCC) in the A/N states shown in FIG. 14a is changed to (SCC, PCC).

Table 6 shows an A/N state mapping table based on the method of FIG. 14a. Table 6 shows some of A/N states for ACK/NACK selection, in which PCC fallback is performed, when the ACK/NACK selection is carried out using four PUCCH resources. The mapping relationship of PUCCH resources and bit values used to transmit the remaining ACK/NACK states can be arbitrarily defined in the present invention. That is, the mapping relationship of PUCCH resources and bit values used to transmit the remaining ACK/NACK states is "don't care" in the present invention.

TABLE 6

| PCC | | SCC | | | |
|---|---|---|---|---|---|
| HARQ-ACK(0) | HARQ-ACK(1) | HARQ-ACK(2) | HARQ-ACK(3) | $n^{(1)}_{PUCCH,i}$ | b(0)b(1) |
| ACK | ACK | NACK/DTX | NACK/DTX | $n^{(1)}_{PUCCH,0}$ | 11 |
| ACK | NACK | NACK/DTX | NACK/DTX | $n^{(1)}_{PUCCH,0}$ | 10 |
| NACK | ACK | NACK/DTX | NACK/DTX | $n^{(1)}_{PUCCH,0}$ | 01 |
| NACK | NACK | NACK/DTX | NACK/DTX | $n^{(1)}_{PUCCH,0}$ | 00 |

Here, HARQ-ACK(0) indicates ACK/NACK/DTX response to CW1 (or TB1) of the PCC and HARQ-ACK(1) indicates ACK/NACK/DTX response to CW2 (or TB2) of the PCC. Similarly, HARQ-ACK(2) represents ACK/NACK/DTX response to CW1 (or TB1) of the SCC and HARQ-ACK(3) represents ACK/NACK/DTX response to CW2 (or TB2) of the SCC. The ACK/NACK/DTX response includes ACK, NACK, and DTX or NACK/DTX. For the PCC, NACK includes NACK, DTX or NACK/DTX. In addition, $n^{(1)}_{PUCCH,i}$ (i=0, 1, 2, 3) indicates a plurality of PUCCH resource indexes occupied for ACK/NACK selection (refer to Equation 1), and $n^{(1)}_{PUCCH,0}$ indicates a PUCCH resource index linked to the PDCCH used for PCC CW (or TB) scheduling (refer to Equation 1). Furthermore, b(0)b(1) corresponding to the ACK/NACK state is transmitted using an implicit PUCCH resource. The b(0)b(1) can be transmitted through the PUCCH format 1b. In this case, the PUCCH resource indicates the PUCCH resource for the PUCCH format 1b.

Figure 15A:
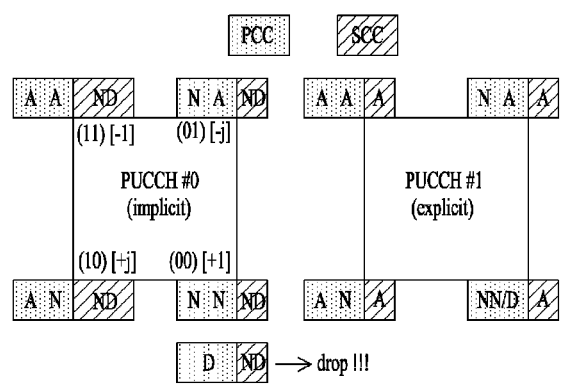
Figure 15B:
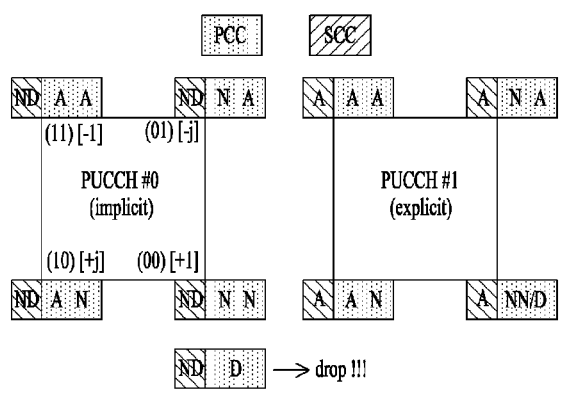

FIG. 15a illustrates an example of mapping A/N states to one implicit PUCCH resource (PUCCH #0) and one explicit PUCCH resource (PUCCH #1) when the PCC and SCC are respectively set to the MIMO and non-MIMO transmission modes (i.e. three A/Ns need to be transmitted). The UE generates and transmits a PUCCH signal according to the illustrated mapping rule. Referring to FIG. 15a, all the above-described PCC fallback method, Method 1 (i.e., A/N state in which D is for the PCC and N/D is for the SCC is not transmitted), and Method 2 (i.e., PCC A/N states are discriminated using different constellation points and SCC A/N states are discriminated using different PUCCH resources) are applied to the mapping method. FIG. 15b illustrates an A/N state mapping method when the CC sequence (PCC, SCC) in the A/N states shown in FIG. 15a is changed to (SCC, PCC).

Figure 16A:
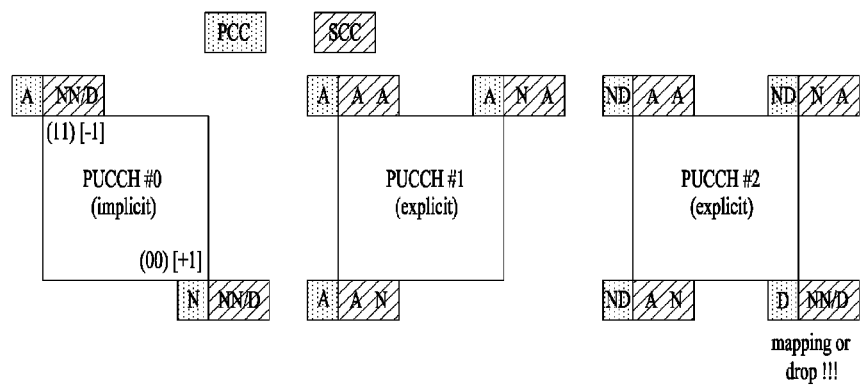

FIG. 16a illustrates an example of mapping A/N states to one implicit PUCCH resource (PUCCH #0) and two explicit PUCCH resources (PUCCHs #1 and #2) when the PCC and SCC are respectively set to the non-MIMO and MIMO transmission modes (i.e. transmission of three A/N states is needed). In this case, the PCC fallback method may be followed by Method 2 in which the PCC and SCC mapping rule has been modified only for the explicit resources, as illustrated in FIG. 16a. When this method is generalized as "Method 2a" for explicit resource mapping of non-MIMO PCC and MIMO SCC, different SCC A/N states may be mapped to different constellation points on each explicit PUCCH resource and SCC A/N states mapped to the same constellation points on different explicit resources may be the same. In the case of PCC, the same PCC A/N state may be mapped to all constellation points on an arbitrary explicit PUCCH resource and different PCC A/N states may be mapped to different explicit PUCCH resources. Method 1 can be applied to an A/N state having the PCC and SCC corresponding to (D, NN/D) without being modified.

In this case, constellation points having no previously mapped A/N state may exist on the explicit resources. Accordingly, it is possible to additionally map the A/N state (D, NN/D) to one of the corresponding constellation points. When this method is generalized as "Method 1a", an A/N state in which "D" is for the PCC and "NN"/"D" (MIMO CC) or "N"/"D" (non-MIMO CC) is for the remaining CCs can be mapped to one of unmapped available constellation points on the explicit PUCCH resources to which Method 2/2a are applied.

Figure 16B:
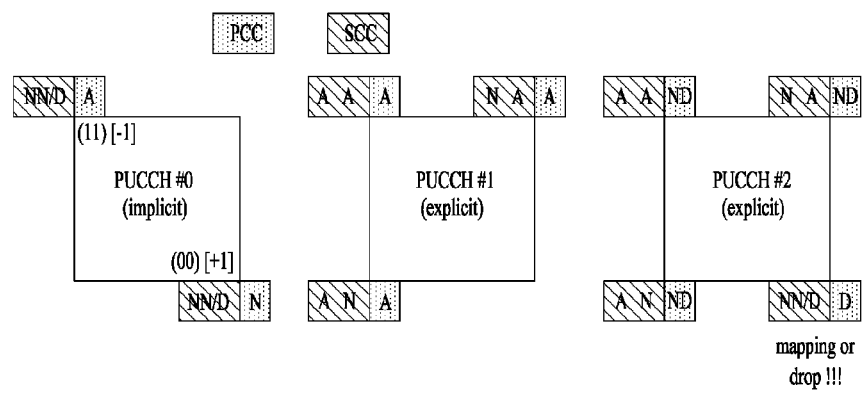

FIG. 16b illustrates an A/N state mapping method when the CC sequence (PCC, SCC) in the A/N states shown in FIG. 16a is changed to (SCC, PCC).

Figure 17A:
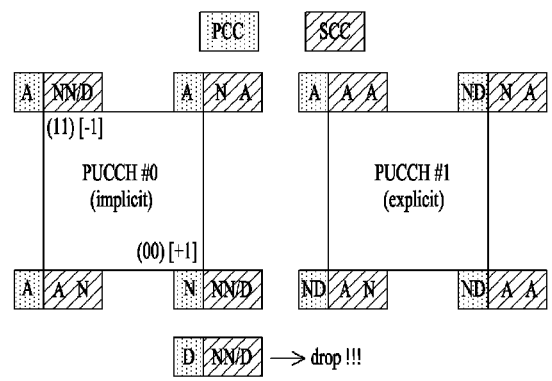

FIG. 17a illustrates a method of mapping A/N states to one implicit PUCCH resource (PUCCH #0) and one explicit PUCCH resource (PUCCH #1) when the PCC and SCC are respectively set to the non-MIMO and MIMO transmission modes (i.e. three A/N states need to be transmitted).

Referring to FIG. 17a, after application of the PCC fallback method and Method 1, A/N states can be additionally mapped to unmapped available constellation points on the implicit resource to reduce use of explicit resource. Here, since only A/N states in which "D" is not set for the PCC can be mapped to the implicit resource, it is preferable to map some of A/N states in which "A" is set for the PCC to the implicit resource in consideration of resource increase due to N/D decoupling. When this method is generalized as "Method 2b" for mapping A/N states of non-MIMO PCC and MIMO SCC, some of the A/N states in which "A" is set for the PCC are mapped to unmapped available constellation points on the implicit PUCCH resource to which the PCC fallback has been applied.

Figure 17B:
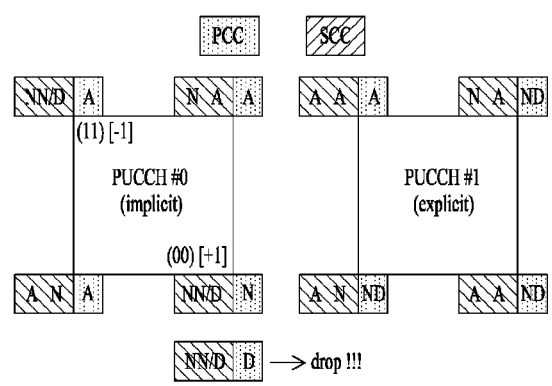

FIG. 17b illustrates an A/N state mapping method when the CC sequence (PCC, SCC) in the A/N states shown in FIG. 17a is changed to (SCC, PCC).

Figure 18A:
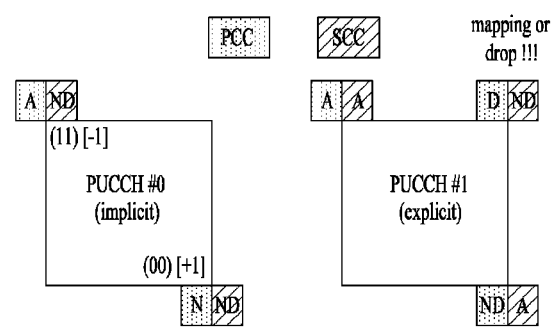

FIG. 18a illustrates a method of mapping A/N states to one implicit PUCCH resource (PUCCH #0) and one explicit PUCCH resource (PUCCH #1) when both the PCC and SCC are set to the non-MIMO mode (i.e. transmission of two A/N states is required). Referring to FIG. 18, all the PCC fallback method, Method 1 or Method 1a (an A/N state having the PCC and SCC corresponding to (D, N/D) is not transmitted or it is mapped to the remaining explicit resource), and Method 2 are applied to the mapping method.

Figure 18B:
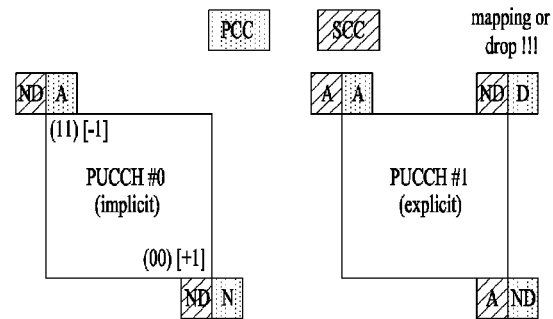

FIG. 18b illustrates an A/N state mapping method when the CC sequence (PCC, SCC) in the A/N states shown in FIG. 18a is changed to (SCC, PCC).

When "explicit ACK/NACK selection" to which the proposed PCC fallback method, Method 1/1a, and Method 2/2a/2b are applied is performed to transmit a plurality of ACK/

NACK states, it is possible to efficiently transmit the ACK/NACK states while minimizing PUCCH resource overhead.

Moreover, an ACK/NACK selection method that uses both the implicit PUCCH resource linked to the PDSCH scheduling the PCC and the implicit PUCCH resource linked to the PDCCH scheduling the SCC may be considered. When two CWs (or two TBs) are transmitted through an arbitrary MIMO transmission mode CC, the PDCCH that schedules the CC, that is, DCI format has relatively large payload, and thus the PDCCH can be encoded to higher than a 2 CCE aggregation level. Accordingly, when the two CWs (or two TBs) are transmitted through the MIMO transmission mode CC, it may be possible to consider use of two implicit PUCCH resources (i.e. implicit PUCCH resources #1 and #2) which are respectively linked to the lowest CCE index nPDCCH of the PDCCH that schedules the CC and the next index nPDCCH+1. When a single CW (or a single TB) is transmitted through a MIMO mode CC or a non-MIMO mode CC, it may be possible to consider use of only one implicit PUCCH resource (i.e., implicit PUCCH resources #1) linked to the lowest CCE index nPDCCH of the PDCCH that schedules the CC. This condition is referred to as "condition #1" for convenience of explanation.

When a single CW is transmitted through an arbitrary MIMO mode CC after an A/N state mapping table considering transmission of two CWs in all MIMO mode CCs is generated, a method of reusing some of the mapping table (preferably, half the mapping table) may be considered. Specifically, two A/N states having ACK or NACK for single CW transmission in an MIMO mode CC may be mapped to two of four A/N states of AA, AN, NA and NN for transmission of two CWs in the corresponding CC. In consideration of ACK/NACK constellation of the PUCCH format 1a/1b for single CW transmission in LTE, A and N for a single CW of an MIMO mode CC can be respectively mapped to AA and NN for two CWs of the corresponding CC (Alt1). In addition, when a signal CW is transmitted, it is possible to consider the CW as the first CW in the case of transmission of two CWs and process the second CW as NACK. That is, A and N for the single CW of the MIMO mode CC can be respectively mapped to AN and NN for the two CWs of the corresponding CC (Alt2).

It is assumed that Alt1 is employed in the specification unless mentioned otherwise. Here, when the single CW is transmitted under the above condition, only the implicit PUCCH #1 linked to the lowest CCE index of the PDCCH that schedules the MIMO mode CC can be used. Accordingly, an A/N state in which AA or NN is set for the corresponding CC cannot be mapped/transmitted to the implicit PUCCH #2 linked to the PDCCH that schedules the corresponding CC (i.e. linked to the corresponding CC). When this method is generalized as "Method 3", an A/N state used for single CW transmission for an arbitrary MIMO mode CC cannot be mapped/transmitted to the implicit PUCCH #2 linked to the corresponding CC.

Under this condition, the A/N state mapping rule for implicit PUCCH resource based ACK/NACK selection can be arranged as follows.

1) Application of the suggested PCC fallback method
   An A/N state in which A, N, or AA, AN, NA, NN is set for the PCC and N/D or NN/D is set for the remaining CCs is mapped to PCC PUCCH #1.

2) Application of the suggested Method 1
   An A/N state in which D is set for the PCC and N/D or NN/D is set for the remaining CCs is not transmitted and mapped to any PUCCH resource.

3) Application of implicit PUCCH resource mapping ("implicit mapping rule")
   An A/N state in which N/D or NN/D is set for an arbitrary CC cannot be mapped/transmitted to any implicit PUCCH resource linked to the corresponding CC.

4) Application of the suggested Method 3
   An A/N state used to transmit a single CW for an MIMO mode CC (e.g. an A/N state in which AA and NN are set for two CWs of the corresponding CC) cannot be mapped/transmitted to the implicit PUCCH #2 linked to the corresponding CC.

As described above with reference to FIG. 11, a DL CC set aggregated by the UE in LTE-A can be UE-specifically allocated through RRC signaling. When the DL CC set is reconfigured using RRC signaling, an A/N feedback related operation may not be normally performed since a DL CC set (or the number of DL CCs) recognized by the BS differs from a DL CC set (or the number of DL CCs) recognized by the UE (i.e. misaligned) in the reconfiguration period. However, the suggested PCC fallback method can prevent misalignment between the BS and UE for at least PCC A/N state even if the DL CC set is changed through RRC signaling thereby the mapping rule (e.g. mapping table) for A/N selection is to be changed. Furthermore, differently from Alt2, Alt1 can prevent misalignment between the BS and UE with respect to PCC A/N state mapping irrespective of whether two CWs (or two TBs) are transmitted or a single CW (or single TB) is transmitted for the PCC even if the DL CC set is changed from a plurality of DL CCs to one PCC through RRC signaling.

Figure 19:
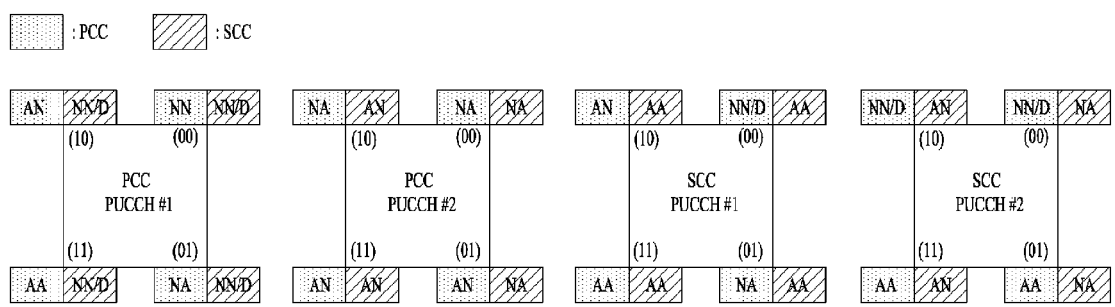

FIG. 19 illustrates an A/N state mapping method when both the PCC and SCC are set to the MIMO mode (i.e. four A/N states need to be transmitted). This mapping method uses two PUCCH resources (referred to as PCC PUCCHs #1 and #2 hereinafter) occupied for ACK/NACK with respect to two CWs (or two TBs) of the PCC and two PUCCH resources (referred to as SCC PUCCHs #1 and #2 hereinafter) occupied for ACK/NACK with respect to two CWs (or two TBs) of the SCC. The PCC PUCCHs #1 and #2 may be implicitly given. The SCC PUCCHs #1 and #2 may be given implicitly or explicitly.

Referring to FIG. 19, an A/N state is mapped to the PCC PUCCH #1 by applying the suggested PCC fallback method and Method 1. Then, the remaining A/N states are mapped to the remaining three resources (PCC PUCCH #2, SCC PUCCH #1 and SCC PUCCH #2) according to the implicit mapping rule and Method 3. Specifically, an A/N state used in a case of a single CW transmission of the PCC, that is, an A/N state AA and NN for two PCC CWs, is not mapped to the PCC PUCCH #2. Similarly, an A/N state used in a case of a single CW transmission of the SCC, that is, an A/N state AA and NN for two SCC CWs, is not mapped to the SCC PUCCH #2.

FIG. 20 illustrates an A/N state mapping method when two CCs are respectively set to the MIMO and non-MIMO transmission modes (i.e. three A/N states need to be transmitted). This mapping method uses two PUCCH resources (referred to as MCC PUCCHs #1 and #2 hereinafter) occupied for ACK/NACK with respect to two CWs (or two TBs) of the MIMO mode CC (referred to as MCC hereinafter) and one PUCCH resource (referred to as non-MCC PUCCH hereinafter) occupied for ACK/NACK with respect to a CW (or TB) of the non-MIMO mode CC (referred to as non-MCC hereinafter). The PUCCH resources may be given explicitly or implicitly.

Referring to FIG. 20, A/N states AA+N/D, AN+N/D, NA+N/D, and NN+N/D for MCC+non-MCC can be mapped to the MCC PUCCH #1 by using the proposed PCC fallback method in consideration of the PCC in the MIMO mode.

Furthermore, A/N states NN/D+A (or NN/DD+A) and NN/D+N (or NN/DD+N)) for MCC+non-MCC can be mapped to the non-MCC PUCCH by using the suggested PCC fallback method in consideration of the PCC in the non-MIMO mode (Alt a).

Here, when NN+N/D (i.e. NNN and NND) is mapped to the MCC PUCCH #1 and NN/D+N (i.e. NNN and DN (or DDN)) is mapped to the non-MCC PUCCH for MCC+non-MCC, as described above, a specific state, for example, NN+N is repeated and the BS may need to perform blind decoding on this specific state. Furthermore, as the same A/N state (i.e., NN+N) is repeatedly mapped to different PUCCH resources, one A/N state that can be transmitted by the UE to the BS is wasted.

To prevent this, it may be possible to map NN+N/D to the MCC PUCCH #1 and map only D+N (or DD+N) from NN/D+N (or NN/DD+N) to the non-MCC PUCCH (Alt b). According to Alt b, whether DTX is set for the MCC can be correctly fed back since only D+N (or DD+N) from NN/D+N (or NN/DD+N) is transmitted on the non-MCC PUCCH. Accordingly, Alt b is advantageous when the PCC operates in the MIMO mode in terms of DTX feedback for the PCC. On the contrary, a method of mapping NN+N/D to the MCC PUCCH #1 and mapping only NN+D from NN+N/D to the non-MCC PUCCH can be considered (Alt c). According to Alt c, whether DTX is set for the non-MCC can be correctly fed back since only NN+D from NN+N/D is transmitted on the MCC PUCCH. Accordingly, Alt c is advantageous when the PCC operates in the non-MIMO mode in terms of DTX feedback for the PCC.

When this method is generalized as "Method 1b", if an A/N state in which A, N, or AA, AN, NA, NN is set for a specific CC (i.e., XCC) and N/D or NN/D is set for other CCs is mapped to implicit PUCCH #1 linked to the XCC, an A/N state in which D is set for the XCC and N or NN is set for all the remaining CCs can be mapped/transmitted to one of implicit PUCCH resources #1 linked to the remaining CCs. If Method 1b is employed when the XCC is considered as the PCC, application of the suggested Method 1 may be omitted.

Consequently, the proposed PCC fallback operation can be performed irrespective of whether the PCC is set to the MIMO mode or non-MIMO mode in any of cases in which Alt a, Alt b and Alt c are applied. According to the present invention, a normal operation can be performed without inconsistency between the BS and UE for at least PCC A/N states at least in the RRC reconfiguration period. Subsequently, the remaining three A/N states AA+A, AN+A and NA+A with respect to MCC+non-MCC are mapped according to the implicit mapping rule and Method 3. Specifically, an A/N state used in a case of a single CW (or TB) transmission of the MCC, that is, an A/N state in which AA and NN are set for two CWs (or two TBs) of the MCC, is not mapped to MCC PUCCH #2.

Tables 7, 8 and 9 show A/N state mapping tables according to the mapping method of FIG. 20. Tables 7, 8 and 9 respectively correspond to Alt 1, Alt 2 and Alt3. Table 7, 8 and 9 show some of A/N states for ACK/NACK selection, in which the PCC fallback is performed. The mapping relationship of PUCCH resources and bit values used to transmit the remaining ACK/NACK states can be arbitrarily defined in the present invention. That is, the mapping relationship of PUCCH resources and bit values used to transmit the remaining ACK/NACK states is "don't care" in the present invention. Tables 7, 8 and 9 show cases in which ACK/NACK selection is performed using three PUCCH resources.

TABLE 7

| MCC | | | | |
|---|---|---|---|---|
| HARQ-ACK(0) | HARQ-ACK(1) | Non-MCC HARQ-ACK(2) | $n^{(1)}_{PUCCH,i}$ | b(0)b(1) |
| ACK | ACK | NACK/DTX | $n^{(1)}_{PUCCH,0}$ | 11 |
| ACK | NACK | NACK/DTX | $n^{(1)}_{PUCCH,0}$ | 10 |
| NACK | ACK | NACK/DTX | $n^{(1)}_{PUCCH,0}$ | 01 |
| NACK | NACK | NACK/DTX | $n^{(1)}_{PUCCH,0}$ | 00 |
| NACK/DTX | NACK/DTX | ACK | $n^{(1)}_{PUCCH,2}$ | 11 |
| NACK/DTX | NACK/DTX | NACK | $n^{(1)}_{PUCCH,2}$ | 00 |

TABLE 8

| MCC | | | | |
|---|---|---|---|---|
| HARQ-ACK(0) | HARQ-ACK(1) | Non-MCC HARQ-ACK(2) | $n^{(1)}_{PUCCH,i}$ | b(0)b(1) |
| ACK | ACK | NACK/DTX | $n^{(1)}_{PUCCH,0}$ | 11 |
| ACK | NACK | NACK/DTX | $n^{(1)}_{PUCCH,0}$ | 10 |
| NACK | ACK | NACK/DTX | $n^{(1)}_{PUCCH,0}$ | 01 |
| NACK | NACK | NACK/DTX | $n^{(1)}_{PUCCH,0}$ | 00 |
| NACK/DTX | NACK/DTX | ACK | $n^{(1)}_{PUCCH,2}$ | 11 |
| DTX | DTX | NACK | $n^{(1)}_{PUCCH,2}$ | 00 |

TABLE 9

| MCC | | | | |
|---|---|---|---|---|
| HARQ-ACK(0) | HARQ-ACK(1) | Non-MCC HARQ-ACK(2) | $n^{(1)}_{PUCCH,i}$ | b(0)b(1) |
| ACK | ACK | NACK/DTX | $n^{(1)}_{PUCCH,0}$ | 11 |
| ACK | NACK | NACK/DTX | $n^{(1)}_{PUCCH,0}$ | 10 |
| NACK | ACK | NACK/DTX | $n^{(1)}_{PUCCH,0}$ | 01 |
| NACK | NACK | DTX | $n^{(1)}_{PUCCH,0}$ | 00 |
| NACK/DTX | NACK/DTX | ACK | $n^{(1)}_{PUCCH,2}$ | 11 |
| NACK/DTX | NACK/DTX | NACK | $n^{(1)}_{PUCCH,2}$ | 00 |

Here, HARQ-ACK(0) indicates ACK/NACK/DTX response to CW1 (or TB1) of the MCC and HARQ-ACK(1) indicates ACK/NACK/DTX response to CW2 (or TB2) of the MCC. HARQ-ACK(2) indicates ACK/NACK/DTX response to a CW (or TB) of the non-MCC. The ACK/NACK/DTX response includes ACK, NACK, and DTX or NACK/DTX. The non-MCC is an SCC if the MCC is a PCC. On the contrary, the MCC is an SCC if the non-MCC is a PCC. In the tables, NACK includes NACK, DTX or NACK/DTX. $n^{(1)}_{PUCCH,\,i}$ (i=0, 1, 2) indicates a plurality of PUCCH resource indexes occupied for ACK/NACK selection. $n^{(1)}_{PUCCH,\,0}$ indicates a PUCCH resource index occupied for ACK/NACK with respect to CW1 (or TB1) of the MCC. $n^{(1)}_{PUCCH,\,2}$ indicates a PUCCH resource index occupied for ACK/NACK with respect to the CW (or TB) of the non-MCC. $n^{(1)}_{PUCCH,\,i}$ (i=0, 1, 2) may be explicitly given or implicitly given according to the LTE method (refer to Equation 1). Data bits b(0)b(1) corresponding to ACK/NACK states is transmitted using implicit PUCCH resources. The data bits b(0)b(1) may be transmitted using the PUCCH format 1b. In this case, PUCCH resources indicate PUCCH resources for the PUCCH format 1b.

Figure 21:
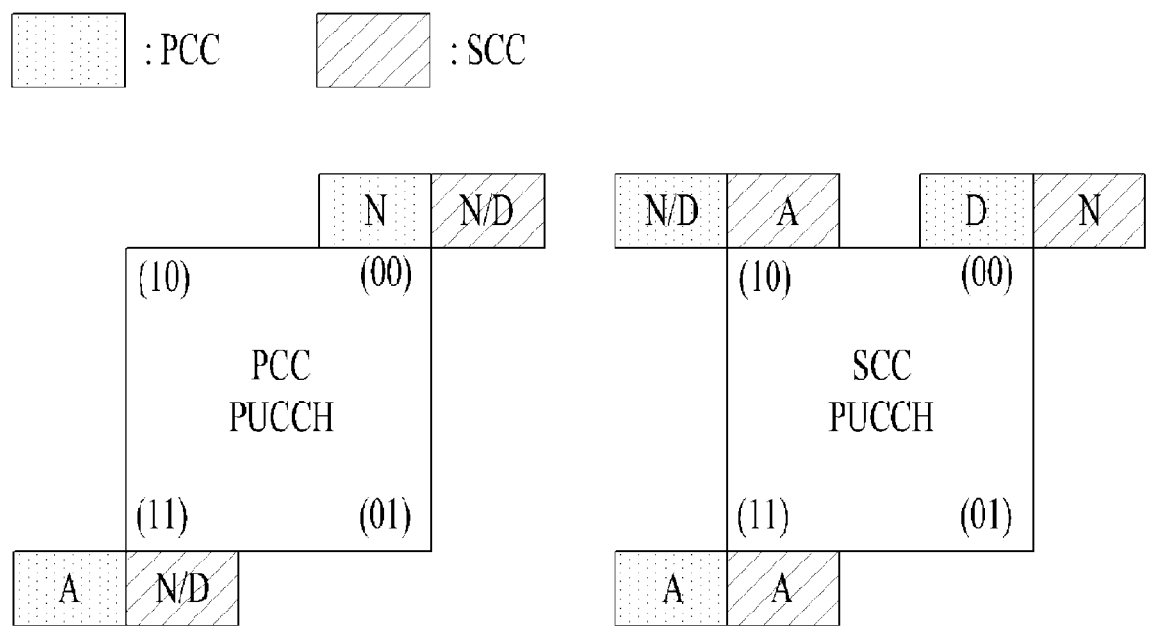

FIG. 21 shows an A/N state mapping method when both the PCC and SCC are set to the non-MIMO transmission mode (i.e., two A/Ns needs to be transmitted). The mapping method uses one PUCCH resource (referred to as PCC PUCCH hereinafter) occupied for ACK/NACK with respect to a CW (or TB) of the PCC and one PUCCH resource (referred to as SCC PUCCH hereinafter) occupied for ACK/NACK with respect to a CW (or TB) of the SCC. The PCC PUCCH may be implicitly given. The SCC PUCCH may be given explicitly or implicitly.

Referring to FIG. 21, an A/N state may be mapped to the PCC PUCCH by using the above suggested PCC fallback method, and an A/N state in which D+N is set for PCC+SCC may be mapped to the SCC PUCCH using the proposed Method 1b. Then, the remaining two A/N states A+A and N/D+A for the PCC+SCC may be mapped according to the aforementioned implicit mapping rule.

Table 10 shows an A/N state mapping table according to the method of FIG. 21. Table 10 shows some of A/N states for ACK/NACK selection, in which the PCC fallback is performed. The mapping relationship of PUCCH resources and bit values used to transmit the remaining ACK/NACK states can be arbitrarily defined in the present invention. That is, the mapping relationship of PUCCH resources and bit values used to transmit the remaining ACK/NACK states is "don't care" in the present invent. Table 10 shows a case in which ACK/NACK selection is performed using two PUCCH resources.

TABLE 10

| PCC HARQ-ACK(0) | SCC HARQ-ACK(1) | $n^{(1)}_{PUCCH,i}$ | b(0)b(1) |
|---|---|---|---|
| ACK | NACK/DTX | $n^{(1)}_{PUCCH,0}$ | 11 |
| NACK | NACK/DTX | $n^{(1)}_{PUCCH,0}$ | 00 |

Here, HARQ-ACK(0) indicates ACK/NACK/DTX response to a CW (or TB) of the PCC and HARQ-ACK(1) indicates ACK/NACK/DTX response to a CW (or TB) of the SCC. The ACK/NACK/DTX response includes ACK, NACK, and DTX or NACK/DTX. $n^{(1)}_{PUCCH,i}$ (i=0, 1) indicates a plurality of PUCCH resource indexes occupied for ACK/NACK selection. $n^{(1)}_{PUCCH,0}$ indicates a PUCCH resource index occupied for ACK/NACK with respect to the CW (or TB) of the PCC. $n^{(1)}_{PUCCH,1}$ indicates a PUCCH resource index occupied for ACK/NACK with respect to the CW (or TB) of the SCC. $n^{(1)}_{PUCCH,0}$ may be implicitly given (refer to Equation 1). $n^{(1)}_{PUCCH,1}$ may be given explicitly or implicitly. Data bits b(0)b(1) may be transmitted using the PUCCH format 1b. In this case, PUCCH resources indicate PUCCH resources for the PUCCH format 1b.

As another ACK/NACK selection method using implicit PUCCH resources, a method using two implicit PUCCHs #1 and #2 respectively linked to the lowest CCE index $n_{PDCCH}$ and the next index $n_{PDCCH}+1$ of a PDCCH that schedules a CC irrespective of the number of transmitted CWs when the CC is set to the MIMO transmission mode can be considered. Furthermore, in the case of a non-MIMO CC, use of only one implicit PUCCH #1 linked to the lowest CCE index $n_{PDCCH}$ of a PDCCH that schedules the corresponding CC can be considered. In this case, application of the proposed Method 3 to the implicit PUCCH #2 is unnecessary. In other words, an A/N state used in a case of a single CW transmission for an arbitrary MIMO mode CC (e.g. an A/N state in which AA and NN are set for two CWs of the corresponding CC) can be mapped/transmitted to/using any implicit PUCCH resource as long as the A/N state observes the implicit mapping rule. This condition is referred to as "condition #2" for convenience of explanation.

Under this condition, the A/N state mapping rule for implicit PUCCH resource based ACK/NACK selection can be arranged as follows by excluding the suggested Method 3.

1) Application of the proposed PCC fallback method
An A/N state in which A, N, or AA, AN, NA, NN is set for the PCC and N/D or A/N is set for the remaining CCs is mapped to the PCC PUCCH #1.
2) Application of the proposed Method 1 or Method 1b
Method 1: An A/N state in which D is set for the PCC and N/D or NN/D is set for the remaining CCs is not transmitted and mapped to any PUCCH resource.
Method 1b: When an A/N state in which A, N, or AA, AN, NA, NN is for a specific CC (i.e., XCC) and N/D or NN/D is set for all the remaining CCs is mapped to the implicit PUCCH #1 linked to the XCC and transmitted, an A/N state in which D is set for the XCC and N or NN is set for the remaining CCs can be mapped/transmitted to/using one of implicit PUCCHs #1 linked to the remaining CCs. Here, the XCC may be a PCC.
3) Application of implicit PUCCH resource mapping ("implicit mapping rule")
An A/N state in which N/D or NN/D is set for an arbitrary CC cannot be mapped/transmitted to any implicit PUCCH resource linked to the corresponding CC.
4) Application of constellation mapping that minimizes A/N error ("gray-like mapping")
A/N states mapped to adjacent symbols on an arbitrary PUCCH resource constellation are mapped such that A/N error is minimized (i.e., A-to-N/D error or N/D-to-A error is minimized in the event of error detection between the A/N states).

Figure 22:
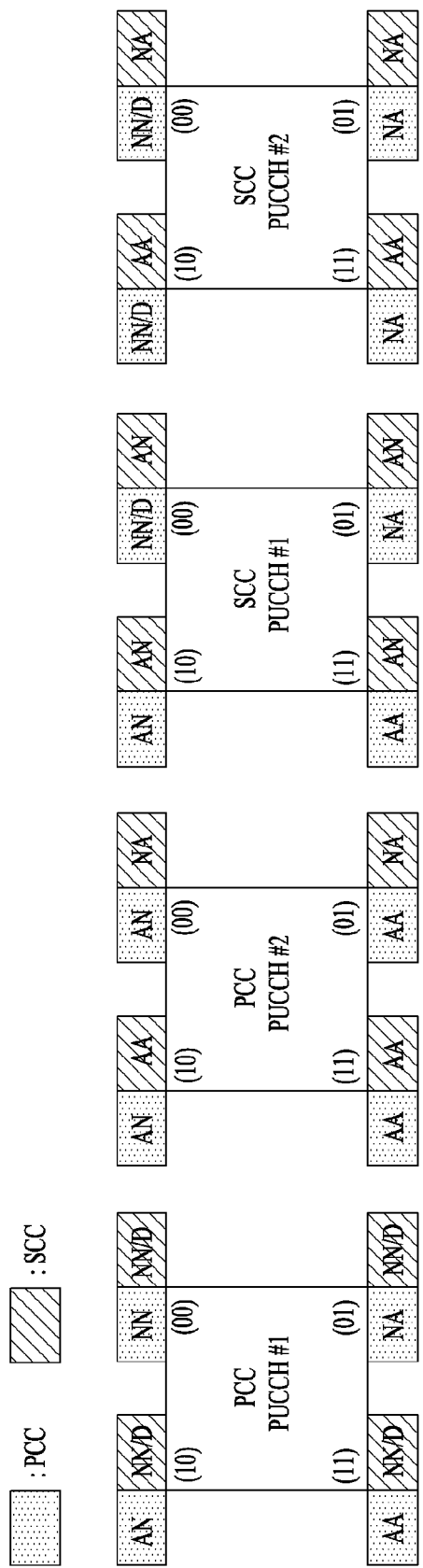

FIG. 22 illustrates a method (ACK/NACK selection method) of mapping an A/N state to a PUCCH resource selected from among a plurality of PUCCH resources when both the PCC and SCC are set to the MIMO mode. This mapping method uses two PUCCH resources (referred to as PCC PUCCHs #1 and #2 hereinafter) occupied for ACK/NACK with respect to two CWs (or two TBs) of the PCC and two PUCCH resources (referred to as SCC PUCCHs #1 and #2 hereinafter) occupied for ACK/NACK with respect to two CWs (or TBs) of the SCC. The PCC PUCCHs #1 and #2 may be implicitly given. The SCC PUCCHs #1 and #2 may be given explicitly or implicitly.

Referring to FIG. 22, an A/N state is mapped to the PCC PUCCH #1 by using the proposed PCC fallback method and Method 1. Then, other A/N states are mapped to other three resources according to the implicit mapping rule and gray-like mapping.

FIG. 23 illustrates a method of mapping an A/N state to a PUCCH resource selected from among a plurality of PUCCH resources when two CCs are respectively set to the MIMO and non-MIMO modes. This mapping method uses two PUCCH resources (referred to as MCC PUCCHs #1 and #2 hereinafter) occupied for ACK/NACK with respect to the two CWs (or two TBs) of the MIMO mode CC (referred to as MCC hereinafter) and one PUCCH resource (referred to as non-MCC PUCCH hereinafter) occupied for ACK/NACK with respect to a CW (or PB) of the non-MIMO mode CC (referred to as non-MCC). The PCC PUCCHs may be given explicitly or implicitly.

Referring to FIG. 23, it is possible to consider A/N state mapping that applies the proposed PCC fallback method to the MCC PUCCH #1 in consideration of the PCC in the MIMO mode and also applies the proposed PCC fallback method to the non-MCC PUCCH in consideration of the PCC in the non-MIMO mode (application of Alt a). Here, considering the XCC as the MCC for application of the proposed Method 1b (particularly, when the PCC is set to the MIMO mode), NN+N/D can be mapped to the MCC PUCCH #1 and D+N can be mapped to the non-MCC PUCCH for MCC+non- MCC. On the contrary, considering the XCC as the non-MCC (particularly, when the PCC is set to the non-MIMO mode), NN/D+N can be mapped to the non-MCC PUCCH and NN+D can be mapped to the MCC PUCCH #1 for the MCC+ non-MCC (application of Alt b and Alt c). The proposed PCC fallback operation can be performed irrespective of whether the PCC is set to the MIMO mode or non-MIMO mode in any of cases in which Alt a, Alt b and Alt c are applied. According to the present invention, a normal operation can be performed without inconsistency between the BS and UE for at least PCC A/N states at least in the RRC reconfiguration period. Subsequently, the remaining A/N states can be mapped according to the implicit mapping rule and gray-link mapping.

Figure 24:
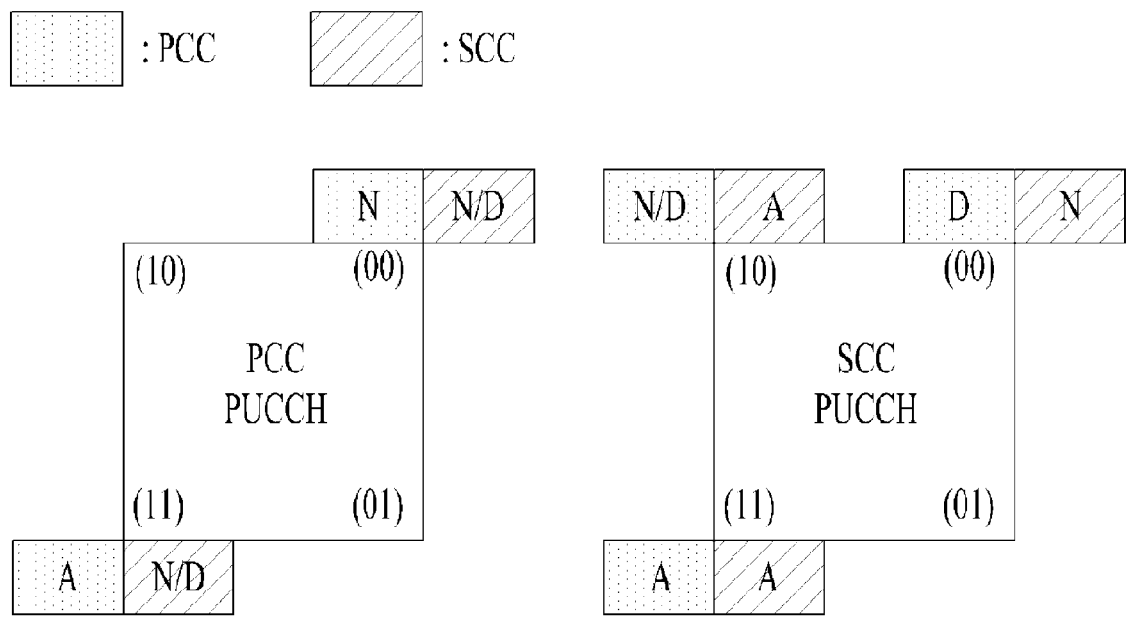

FIG. 24 illustrates a method of mapping an A/N state to a PUCCH resource selected from among a plurality of PUCCH resources when both the PCC and SCC are set to non-MIMO mode. This mapping method uses one PUCCH resource (referred to as PCC PUCCH hereinafter) occupied for ACK/NACK with respect to a CW (or TB) of the PCC and one PUCCH resource (referred to as SCC PUCCH hereinafter) occupied for ACK/NACK with respect to a CW (or PB) of the SCC. The PCC PUCCH may be given implicitly. The SCC PUCCH may be given explicitly or implicitly.

Referring to FIG. 24, an A/N state in which D+N is set for PCC+SCC can be mapped by applying the suggested PCC fallback method to the PCC PUCCH and applying the proposed Method 1b to the SCC PUCCH. Then, the other A/N state can be mapped according to the implicit mapping rule and gray-like mapping. In this case, a final A/N state mapping result may be similar or equal to the above condition #1 based A/N state mapping result.

As another ACK/NACK selection method using implicit PUCCH resources, a method using only the implicit PUCCH resource linked to the lowest CCE index $n_{PDCCH}$ of a PDCCH that schedules an arbitrary CC irrespective of transmission mode for the CC can be considered. Furthermore, when the number of MIMO mode CCs is M, it is possible to consider use of M explicit PUCCH resources together with the implicit PUCCH resource. In this case, it is not necessary to apply/observe the proposed Method 3 and implicit mapping rule for the explicit PUCCH resources. This condition is referred to as "condition #3" for convenience of explanation.

Under this condition, the A/N state mapping rule for implicit PUCCH resource based ACK/NACK selection can be arranged as follows by excluding the suggested Method 3 and the implicit mapping rule.

1) Application of the proposed PCC fallback method
An A/N state in which A, N, or AA, AN, NA, NN is set for the PCC and N/D or A/N is set for all the remaining CCs is mapped to the PCC PUCCH #1.

2) Application of the proposed Method 1 or Method 1b
Method 1: An A/N state in which D is set for the PCC and N/D or NN/D is set for all the remaining CCs is not transmitted and mapped to any PUCCH resource.
Method 1b: When an A/N state in which A, N, or AA, AN, NA, NN is set for a specific CC (i.e., XCC) and N/D or NN/D is set for all the remaining CCs is mapped to the implicit PUCCH #1 linked to the XCC and transmitted, an A/N state in which D is set for the XCC and N or NN is set for all the remaining CCs can be mapped/transmitted to one of implicit PUCCHs #1 linked to the remaining CCs. Here, the XCC may be a PCC.

3) Application of constellation mapping that minimizes A/N error ("gray-like mapping")
A/N states mapped to adjacent symbols on an arbitrary PUCCH resource constellation are mapped such that A/N error is minimized (i.e., A-to-N/D error or N/D-to-A error is minimized in the event of error detection between the A/N states).

On the basis of the above mapping rule, A/N state mapping results for three cases (a case in which both the PCC and SCC are set to the MIMO mode, a case in which two CCs are respectively set to the MIMO and non-MIMO modes, and a case in which the both the PCC and SCC are set to the non-MIMO mode) may be similar or equal to the above condition #2 based A/N state mapping results (FIGS. 22, 23 and 24).

Figure 25:
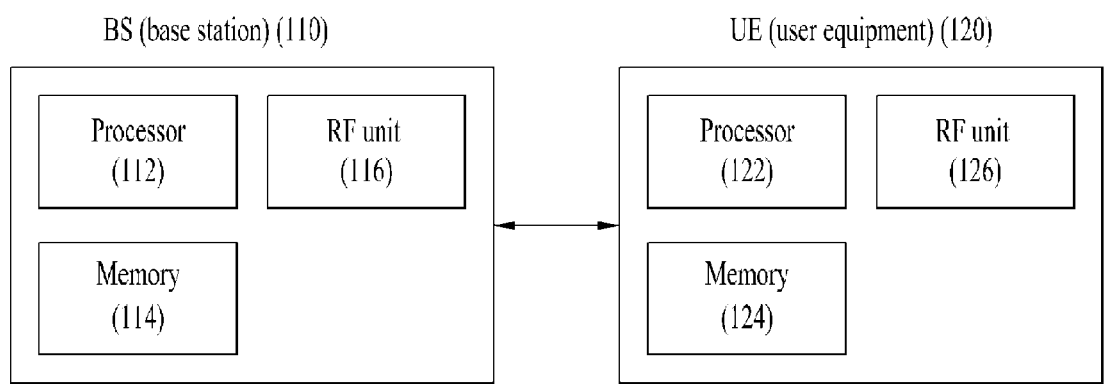
FIG. 25 shows a base station and a UE applicable to an embodiment of the present invention.

FIG. 25 shows a BS and a UE applicable to an embodiment of the present invention. If a wireless communication system includes a relay, communication is carried out between a BS and the relay on backhaul link and communication is performed between the relay and a UE on access link. Accordingly, the BS and UE shown in the figure may be substituted by the relay depending on the circumstance.

Referring to FIG. 25, a wireless communication system includes the BS 100 and UE 120. The BS 100 includes a processor 112, a memory 114 and a radio frequency (RF) unit 116. The processor 112 may be configured such that it implements the procedures and/or methods suggested by the present invention. The memory 114 is connected to the processor 112 and stores information regarding the operation of the processor 112. The RF unit 116 is connected to the processor 112 and transmits and/or receives RF signals. The UE 120 may be configured such that it implements the procedures and/or methods proposed by the present invention. The UE includes a processor 122, a memory 124 and an RF unit 126. The process 122 may be configured such that it implements the procedures and/or methods suggested by the present invention. The memory 124 is connected to the processor 122 and stores information regarding the operation of the processor 122. The RF unit 126 is connected to the processor 122 and transmits and/or receives RF signals. The BS 100 and/or the UE 120 may include a single antenna or multiple antennas.

The aforementioned embodiments are achieved by combination of elements and features of the present invention in a predetermined manner. Each of the elements or features should be considered selectively unless specified separately. Each of the elements or features may be carried out without being combined with other elements or features. Also, some elements and/or features may be combined with one another to constitute the embodiments of the present invention. The order of operations described in the embodiments of the present invention may be changed. Some elements or features of one embodiment may be included in another embodiment, or may be replaced with corresponding structural elements or features of another embodiment. It will be apparent that claims which are not explicitly dependent on each other can be combined to provide an embodiment or new claims can be added through amendment after this application is filed.

The embodiments of the present invention have been described based on the data transmission and reception between a base station and a user equipment. In this case, the base station means a terminal node of a network, which performs direct communication with the mobile station. A specific operation which has been described as being performed by the base station may be performed by an upper node of the base station as the case may be. In other words, it will be apparent that various operations performed for communication with the mobile station in the network which includes a plurality of network nodes along with the base station may be performed by the base station or network nodes other than the base station. The base station may be replaced with terms such as fixed station, Node B, eNode B (eNB), and Access Point (AP). Also, the user equipment may be replaced with terms such as Subscriber Station (SS), Mobile Subscriber Station (MSS), Mobile Terminal (MT) and a terminal.

The embodiments according to the present invention can be implemented by various means, for example, hardware, firmware, software, or combination thereof. In a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor. The memory unit may be located inside or outside the processor to transmit and receive data to and from the processor through various means which are well known.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

The present invention can be used in a wireless communication system such as UE, relay, BS, etc.

What is claimed is:

1. A method for transmitting uplink control information by a user equipment (UE) configured with a plurality of cells including a primary cell and a secondary cell in a wireless communication system, the method comprising:

identifying, by the UE, a Hybrid Automatic Repeat reQuest—Acknowledgement (HARQ-ACK)(0) and a HARQ-ACK(1); and transmitting, by the UE, bits b(0)b(1) using a Physical Uplink Control Channel (PUCCH) resource among a plurality of PUCCH resources based on the HARQ-ACK(0) and the HARQ-ACK(1) to a base station (BS) for signaling the HARQ-ACK(0) and the HARQ-ACK(1), wherein the b(0)b(1) and the PUCCH resource are given according to a relation including Table 1,

TABLE 1

| HARQ-ACK(0) | HARQ-ACK(1) | $n^{(1)}_{PUCCH,i}$ | b(0)b(1) |
|---|---|---|---|
| ACK | NACK/DTX | $n^{(1)}_{PUCCH,0}$ | 11 |
| NACK | NACK/DTX | $n^{(1)}_{PUCCH,0}$ | 00 | where the HARQ-ACK(0) indicates an ACK/Negative ACK (ACK/NACK)/Discontinuous Transmission (DTX) response to a data block related to the primary cell, the HARQ-ACK(1) indicates an ACK/NACK/DTX response to a data block related to the secondary cell, $n^{(1)}_{PUCCH,i}$ (i=0, 1) indicates the plurality of PUCCH resources, and $n^{(1)}_{PUCCH,0}$ indicates a PUCCH resource linked to a Physical Downlink Control Channel (PDCCH) on the primary cell.

2. The method according to claim 1, wherein no transmission is performed if the HARQ-ACK(0) is the DTX and the HARQ-ACK(1) is the NACK.

3. The method according to claim 1, wherein the primary cell includes a primary component carrier (PCC) and the secondary cell includes a secondary component carrier (SCC).

4. A user equipment (UE) configured with a plurality of cells including a primary cell and a secondary cell and configured to transmit uplink control information in a wireless communication system, the UE comprising:

a radio frequency (RF) unit; and a processor operatively coupled to the RF unit and configured to:

identify a Hybrid Automatic Repeat reQuest—Acknowledgement (HARQ-ACK)(0) and a HARQ-ACK(1), and transmit, via the RF unit, bits b(0)b(1) using a Physical Uplink Control Channel (PUCCH) resource among a plurality of PUCCH resources to a base station (BS) for signaling the HARQ-ACK(0) and the HARQ-ACK(1), wherein the b(0)b(1) and the PUCCH resource are given according to a relation including Table 1,

TABLE 1

| HARQ-ACK(0) | HARQ-ACK(1) | $n^{(1)}_{PUCCH,i}$ | b(0)b(1) |
|---|---|---|---|
| ACK | NACK/DTX | $n^{(1)}_{PUCCH,0}$ | 11 |
| NACK | NACK/DTX | $n^{(1)}_{PUCCH,0}$ | 00 | where the HARQ-ACK(0) indicates an ACK/Negative ACK (ACK/NACK)/Discontinuous Transmission (DTX) response to a data block related to the primary cell, the HARQ-ACK(1) indicates an ACK/NACK/DTX response to a data block related to the secondary cell, $n^{(1)}_{PUCCH,i}$ (i=0, 1) indicates the plurality of PUCCH resources, and $n^{(1)}_{PUCCH,0}$ indicates a PUCCH resource linked to a Physical Downlink Control Channel (PDCCH) on the primary cell.

5. The UE according to claim 4, wherein no transmission is performed if the HARQ-ACK(0) is the DTX and the HARQ-ACK(1) is the NACK.

6. The UE according to claim 4, wherein the primary cell includes a primary component carrier (PCC) and the secondary cell includes a secondary component carrier (SCC).

7. A method for receiving uplink control information by a base station (BS) configured with a plurality of cells including a primary cell and a secondary cell in a wireless communication system, the method comprising:

receiving, by the BS, bits b(0)b(1) using a Physical Uplink Control Channel (PUCCH) resource among a plurality of PUCCH resources from a user equipment (UE), the bits b(0)b(1) being determined based on a Hybrid Automatic Repeat reQuest —Acknowledgement (HARQ-ACK)(0) and a HARQ-ACK(1) identified by the UE; and identifying, by the BS, the HARQ-ACK(b) and the HARQ-ACK(1) based on the b(0)b(1) and the PUCCH resource, wherein the HARQ-ACK(0) and the HARQ-ACK(1) are identified by the BS according to a relation including Table 1,

TABLE 1

| HARQ-ACK(0) | HARQ-ACK(1) | $n^{(1)}_{PUCCH,i}$ | b(0)b(1) |
|---|---|---|---|
| ACK | NACK/DTX | $n^{(1)}_{PUCCH,0}$ | 11 |
| NACK | NACK/DTX | $n^{(1)}_{PUCCH,0}$ | 00 | where the HARQ-ACK(0) indicates an ACK/Negative ACK (ACK/NACK)/Discontinuous Transmission (DTX) response to a data block related to the primary cell, the HARQ-ACK(1) indicates an ACK/NACK/DTX response to a data block related to the secondary cell, $n^{(1)}_{PUCCH,i}$ (i=0, 1) indicates the plurality of PUCCH resources, and $n^{(1)}_{PUCCH,0}$ indicates a PUCCH resource linked to a Physical Downlink Control Channel (PDCCH) on the primary cell.

8. The method according to claim 7, wherein if no reception is detected, the HARQ-ACK(0) is identified as the DTX and the HARQ-ACK(1) is identified as the NACK.

9. The method according to claim 7, wherein the primary cell includes a primary component carrier (PCC) and the secondary cell includes a secondary component carrier (SCC).

10. A base station (BS) configured with a plurality of cells including a primary cell and a secondary cell and configured to receive uplink control information in a wireless communication system, the BS comprising:
   a radio frequency (RF) unit; and
   a processor operatively coupled to the RF unit and configured to:
      receive, via the RF unit, bits b(0)b(1) using a Physical Uplink Control Channel (PUCCH) resource among a plurality of PUCCH resources from a user equipment (UE), the bits b(0)b(1) being determined based on a Hybrid Automatic Repeat request—Acknowledgement (HARQ-ACK)(0) and a HARQ-ACK(1) identified by the UE, and
   identify the HARQ-ACK(0) and the HARQ-ACK(1) based on the b(0)b(1) and the PUCCH resource, wherein the HARQ-ACK(0) and the HARQ-ACK(1) are identified by the BS according to the relation including Table 1,

TABLE 1

| HARQ-ACK(0) | HARQ-ACK(1) | $n^{(1)}_{PUCCH,i}$ | b(0)b(1) |
|---|---|---|---|
| ACK | NACK/DTX | $n^{(1)}_{PUCCH,0}$ | 11 |
| NACK | NACK/DTX | $n^{(1)}_{PUCCH,0}$ | 00 | where the HARQ-ACK(0) indicates an ACK/Negative ACK (ACK/NACK)/Discontinuous Transmission (DTX) response to a data block related to the primary cell, the HARQ-ACK(1) indicates ACK/NACK/DTX response to a data block related to the secondary cell, $n^{(1)}_{PUCCH,i}$ (i=0, 1) indicates the plurality of PUCCH resources, and $n^{(1)}_{PUCCH,0}$ indicates a PUCCH resource linked to a Physical Downlink Control Channel (PDCCH) on the primary cell.

11. The BS according to claim 10, wherein if no reception is detected, the HARQ-ACK(0) is identified as the DTX and the HARQ-ACK(1) is identified as the NACK.

12. The BS according to claim 10, wherein the primary cell includes a primary component carrier (PCC) and the secondary cell includes a secondary component carrier (SCC).

* * * * *